United States Patent
Surace

(10) Patent No.: US 11,079,489 B2
(45) Date of Patent: Aug. 3, 2021

(54) WEATHER RADAR DETECTION OF OBJECTS

(71) Applicant: Honeywell International Inc., Morris Plains, NJ (US)

(72) Inventor: Lawrence J. Surace, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 524 days.

(21) Appl. No.: 15/444,716

(22) Filed: Feb. 28, 2017

(65) Prior Publication Data

US 2018/0246205 A1    Aug. 30, 2018

(51) Int. Cl.
| | |
|---|---|
| G01S 13/95 | (2006.01) |
| G01S 13/60 | (2006.01) |
| G01S 13/933 | (2020.01) |
| G01S 13/02 | (2006.01) |
| G01S 7/41 | (2006.01) |

(52) U.S. Cl.
CPC ............ G01S 13/953 (2013.01); G01S 13/60 (2013.01); G01S 13/933 (2020.01); *G01S 7/412* (2013.01); *G01S 2013/0245* (2013.01); *G01S 2013/0254* (2013.01); *G01S 2013/0272* (2013.01); *Y02A 90/10* (2018.01)

(58) Field of Classification Search
CPC ............................... G01S 13/953; G01S 13/60
USPC ........................................................ 342/26 B
See application file for complete search history.

(56) References Cited

U.S. PATENT DOCUMENTS

| | | | |
|---|---|---|---|
| 4,141,522 A | * | 2/1979 | Lambregts ........... G05D 1/0676 244/186 |
| 5,661,486 A | | 8/1997 | Faivre et al. |
| 5,945,926 A | * | 8/1999 | Ammar ................. F41G 7/2226 340/970 |
| 6,208,284 B1 | | 3/2001 | Woodell et al. |
| 6,741,208 B1 | | 5/2004 | West et al. |
| 7,068,210 B1 | | 6/2006 | Mitra et al. |

(Continued)

FOREIGN PATENT DOCUMENTS

| | | |
|---|---|---|
| EP | 1533866 A1 | 5/2005 |
| EP | 2857857 A1 | 4/2015 |

(Continued)

OTHER PUBLICATIONS

Stephan, "Potential Use of On-Board Radar for Bird Detection and Avoidance," Proceedings of 2nd Bird Strike Committee—USA/Canada Meeting, Aug. 8-10, 2000, 2 pp.

(Continued)

*Primary Examiner* — Erin F Heard
*Assistant Examiner* — Helena H Seraydaryan
(74) *Attorney, Agent, or Firm* — Shumaker & Sieffert, P.A.

(57) ABSTRACT

In some examples, a radar system is configured to mount on an ownship vehicle for interleaving a weather detection mode and an object detection mode. The radar system comprises a phased-array radar device configured to receive weather signals in the weather detection mode, receive sensing signals in the object detection mode, and interleave the weather detection mode and the object detection mode. The radar system further comprises processing circuitry configured to determine weather conditions based on the received weather signals and detect an object based on the received sensing signals.

20 Claims, 17 Drawing Sheets

(56) References Cited

U.S. PATENT DOCUMENTS

| | | | |
|---|---|---|---|
| 7,706,979 | B1 | 4/2010 | Herwitz |
| 8,052,767 | B2 | 11/2011 | Sands et al. |
| 8,134,491 | B1 | 3/2012 | Meyer et al. |
| 8,170,730 | B2 | 5/2012 | Shue |
| 8,279,109 | B1 | 10/2012 | Piesinger |
| 8,570,211 | B1 | 10/2013 | Piesinger |
| 8,576,112 | B2 | 11/2013 | Garrec et al. |
| 8,616,144 | B2 | 12/2013 | Yifrach |
| 8,757,551 | B2 | 6/2014 | Margalit |
| 9,208,687 | B2 | 12/2015 | Wang et al. |
| 2010/0042275 | A1 | 2/2010 | Kirk |
| 2010/0114416 | A1 | 5/2010 | Au et al. |
| 2011/0125349 | A1 | 5/2011 | Ace |
| 2012/0313779 | A1* | 12/2012 | Papaefstathiou .... G05D 1/0038 340/540 |
| 2013/0041856 | A1 | 2/2013 | Benitez et al. |
| 2013/0088380 | A1 | 4/2013 | Isoda |
| 2014/0085107 | A1* | 3/2014 | Gutierrez ......... G08G 1/096766 340/905 |
| 2014/0139366 | A1 | 5/2014 | Moses et al. |
| 2015/0285897 | A1 | 10/2015 | Kilty et al. |
| 2016/0023760 | A1* | 1/2016 | Goodrich ................. G05D 1/12 244/10 |
| 2016/0282131 | A1 | 9/2016 | Palfreyman |
| 2016/0363652 | A1 | 12/2016 | Hamminga et al. |
| 2017/0090011 | A1 | 3/2017 | West et al. |
| 2017/0346169 | A1* | 11/2017 | Wang ..................... H01Q 13/22 |

FOREIGN PATENT DOCUMENTS

| | | | |
|---|---|---|---|
| WO | 2010023253 | A1 | 3/2010 |
| WO | 2010034297 | A1 | 4/2010 |

OTHER PUBLICATIONS

Short, et al., "Birdstrike Prevention: Applying Aero-Science and Bio-Science," International Bird Strike Committee, Apr. 17, 2000, pp. 463-485.

Spencer, "A Compact Phased Array Radar for UAS Sense and Avoid," Brigham Young University, BYU Scholars Archive, Nov. 2015, 107 pp.

NASA et al., "First Steps Toward Drone Traffic Management," Nasa Ames, retrieved from https://www.nasa.gov/feature/ames/first-steps-toward-drone-traffic-management, Nov. 19, 2015, 20 pp.

Honeywell Aerospace, "More Accurate Weather Detection at Long Ranges," IntuVue, Oct. 2008, Honeywell International Inc., 2 pp.

"WXR-2100 MultiScan ThreatTrack Weather Radar," Rockwell Collins, Mar. 2014, 2 pp.

"Would Radars Detect Drones?," Awesome Drones, retrieved from http://awesome-drones.com/would-radars-detect-drones/, date accessed Jan. 16, 2017, 5 pp.

U.S. Appl. No. 14/488,154, by Honeywell International Inc. (Inventors: David C. Vacanti et al.), filed Sep. 16, 2014.

U.S. Appl. No. 15/374,958, by Honeywell International Inc. (Inventors: Niranjan Kalyandurg et al.), filed Dec. 9, 2016.

U.S. Appl. No. 14/488,129, by Honeywell International Inc. (Inventors: David C. Vacanti.), filed Sep. 16, 2014.

Extended Search Report from counterpart European Application No. 18158682.7, dated Jul. 11, 2018, 8 pp.

Response to Extended Search Report dated Sep. 3, 2018, from counterpart European Application No. 18158682.7, filed Nov. 27, 2018, 37 pp.

Gauthreaux, Jr. et al., "Monitoring bird migration with a fixed-beam radar and a thermal-imaging camera," J. Field Ornithol. 77 (3), Sep. 11, 2006, pp. 319-328.

Dong, et al., "A Review of Radar Techniques for Ornithological Observations," 2009 IEEE, Atennas and Propagation Society International Symposium, Jun. 2009, 4 pp.

Gauthreaux Jr., et al., "Wildlife in Airport Environments: Chapter 13 Radar Technology to Monitor Hazardous Birds at Airports," John Hopkins University Press, Sep. 27, 2013, pp. 141-151.

Examination Report from counterpart European Application No. 18158682.7, dated May 20, 2020, 7 pp.

Response to the Examination Report dated May 20, 2020, from counterpart European Application No. 18158682.7, filed Sep. 4, 2020, 34 pp.

* cited by examiner

WEATHER RADAR DETECTION OF OBJECTS

TECHNICAL FIELD

This disclosure relates to preventing collisions and, more particularly, to preventing collisions using weather radar.

BACKGROUND

A phased-array radar device may include an antenna array, where each antenna is configured to transmit or receive electromagnetic signals. The phased-array radar device may control the direction of a beam of electromagnetic signals that is transmitted by the antenna array. The direction of the beam may be based on the phase relationship (i.e., phase shift) of the electromagnetic signals transmitted from each antenna of the antenna array. Each antenna of the antenna array may include a separate transmitter and/or receiver to generate a phase shift, or the antennas may share one or more transmitters and/or receivers.

A phased-array radar device may include electronic scanning rather than or in addition to mechanical scanning. The electronic scanning may include generating a phase shift in the electromagnetic signals transmitted by the antenna array to control the direction of a beam. The electronic scanning may also include determining a phase shift in electromagnetic signals received by the antenna array. In some examples, the phased-array radar device may include a mechanical scanning apparatus for moving, tilting, and/or rotating the antenna array.

SUMMARY

This disclosure is directed to systems, devices, and methods for detecting weather conditions and detecting objects using a single radar system. The radar system includes a phased-array radar device configured to interleave a weather detection mode and an object detection mode. The radar system also includes processing circuitry configured to determine weather conditions and detect objects based on the signals received by the phased-array radar device.

In one example, a radar system, configured to mount on an ownship vehicle, for interleaving a weather detection mode and an object detection mode. The radar system includes a phased-array radar device configured to receive weather signals in the weather detection mode, receive sensing signals in the object detection mode, and interleave the weather detection mode and the object detection mode. The radar system further includes processing circuitry configured to determine weather conditions based on the received weather signals and detect an object based on the received sensing signals.

In another example, a method for interleaving a weather detection mode and an object detection mode includes receiving, by a phased-array radar device, weather signals in the weather detection mode. The method further includes receiving, by the phased-array radar device, sensing signals in the object detection mode. The method also includes interleaving the weather detection mode and the object detection mode. The method includes determining, by processing circuitry, weather conditions based on the received weather signals. The method also includes detecting, by the processing circuitry, an object based on the received sensing signals.

Another example is directed to a device including a computer-readable medium having executable instructions stored thereon, configured to be executable by one or more processors for causing the one or more processors to receive, from a phased-array radar device, weather signals in the weather detection mode. The executable instructions further cause the one or more processors to receive, from the phased-array radar device, sensing signals in the object detection mode. The executable instructions further cause the one or more processors to interleave the weather detection mode and the object detection mode. The executable instructions further cause the one or more processors to determine weather conditions based on the received weather signals. The executable instructions further cause the one or more processors to detect an object based on the received sensing signals.

The details of one or more examples are set forth in the accompanying drawings and the description below. Other features, objects, and advantages will be apparent from the description and drawings, and from the claims.

DETAILED DESCRIPTION

Figure 1:
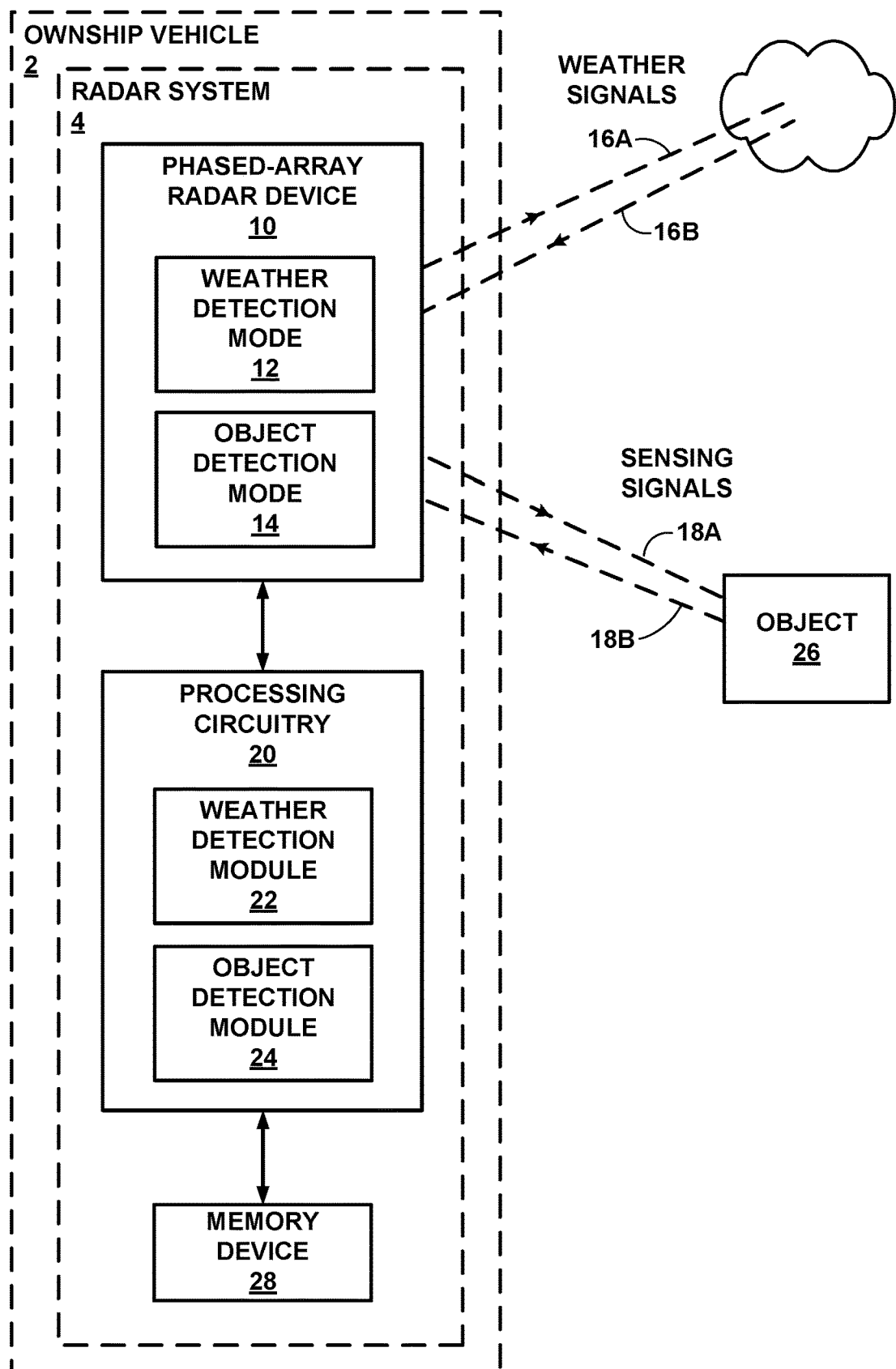
FIG. 1 is a conceptual block diagram of a radar system, onboard an ownship vehicle, configured to interleave a weather detection mode and an object detection mode, in accordance with some examples of this disclosure.

Various examples are described below generally directed to devices, systems, and methods for using weather radar to prevent collisions with objects. A phased-array radar device of a radar system configured to mount on an ownship vehicle may be configured to detect weather conditions such as reflectivity and wind shear based on returned weather signals in a weather detection mode. The phased-array radar device may also receive returned sensing signals from objects such as objects in an object detection mode. The processing circuitry of the radar system may be configured to determine weather conditions and detect objects based on the signals received by the phased-array radar device.

The radar system is configured to interleave the weather detection mode and the object detection mode by cycling through each mode. The processing circuitry may include a weather detection module configured to implement the weather detection mode in the phased-array radar device. The processing circuitry may also include an object detection module configured to implement the object detection mode in the phased-array radar device. The phased-array radar device may be configured to interleave the two modes by transmitting and receiving weather signals in the weather detection mode, then transmitting and receiving sensing signals in the object detection mode, and then returning to the weather detection mode. The interleaving or cycling of weather detection mode and object detection mode may occur at a relatively fast rate, as compared to other radar systems. In some examples, the radar system may be configured to operate in both modes simultaneously by determining weather conditions and detecting objects based on analysis of received signals. In some examples, "simultaneous" operation in both modes may include interleaving the two modes at a sufficiently fast rate, such that the operation of the radar system appears to a user to operate in both modes simultaneously.

A radar system of this disclosure may detect objects in a cooperative mode or a non-cooperative mode. In a cooperative mode, the radar system may detect an object by transmitting sensing signals and receiving the returned sensing signals that reflect off the object. The radar system may then transmit interrogation signals to the object and receive surveillance signals from the object. In some examples, the surveillance signals may be automatic dependent surveillance-broadcast (ADS-B) signals that indicate the location and the bearing of the object.

In a non-cooperative mode, the radar system may detect an object by transmitting sensing signals and receiving the returned sensing signals that reflect off the object. If the radar system transmits interrogation signals to the object, the object may not respond in the non-cooperative mode because the object may lack the ability to transmit surveillance signals or the object may have disabled the ability. To detect the object, the processing circuitry of the radar system may analyze the returned sensing signals received by the phased-array radar device. The processing circuitry may be configured to detect the object and to determine characteristics of the object including, but not limited to, the location, direction of travel, velocity, size, shape, type of object, and/or any other characteristics based on the characteristics of the returned sensing signals. The characteristics of the returned sensing signals may include amplitude, frequency, phase shift across an antenna array, and/or any other signal characteristics. The processing circuitry may be configured to determine these characteristics based on the parameters and profiles of common objects.

For example, if the ownship vehicle is an aircraft, the radar system may include memory device 28 that stores the parameters and profiles of common objects such as unmanned aerial vehicles (UAVs). The UAVs parameters and profiles may include the ranges of sizes, maximum horizontal velocities, maximum vertical velocities, maximum operating altitudes, reflectivity profiles, spectral profiles, and any other parameters. In some examples, the characteristics of sensing signals reflected off of the surface of a UAV and the moving blades of the UAV may differ from sensing signals reflected off of other similarly sized objects, such as birds and balloons. For example, the feathers and rounded features of a bird may cause the sensing signals to reflect differently, as compared to the reflections of the plastic, metal, and sharp features of a UAV. The processing circuitry of the radar system of this disclosure may be configured to analyze the returned signals to detect objects by comparing the signals characteristics to the expected signals of objects.

FIG. 1 is a conceptual block diagram of a radar system 4 onboard an ownship vehicle 2 for interleaving weather detection mode 12 and object detection mode 14, in accordance with some examples of this disclosure. Processing circuitry 20 may include weather detection module 22 for implementing weather detection mode 12 in phased-array radar device 10. Processing circuitry 20 may include object detection module 24 for implementing object detection mode 14 in phased-array radar device 10. Ownship vehicle 2 may be any mobile object or remote object including radar system 4 for detecting weather and objects. In some examples, ownship vehicle 2 may be an aircraft such as a helicopter or a weather balloon, or ownship vehicle 2 may be a space vehicle such as a satellite or spaceship. In yet other examples, ownship vehicle 2 may include a land vehicle such as an automobile or a water vehicle such as a ship or a submarine. Ownship vehicle 2 may be a manned vehicle or an unmanned vehicle, such as a drone, a remote-control vehicle, or any suitable vehicle without any pilot or crew on board.

Ownship vehicle 2 may include equipment for determining the information included in the surveillance data. For example, ownship vehicle 2 may include satellite navigation equipment such as a Global Positioning System (GPS) or any other suitable means for determining the location of ownship vehicle 2. Ownship vehicle 2 may include processing circuitry for determining the speed, velocity, bearing, and course of ownship vehicle 2 using, for example, satellite navigation, a compass, flight plan data, and/or any other suitable equipment. The processing circuitry in ownship vehicle 2 may determine the course of ownship vehicle 2 using the current trajectory of ownship vehicle 2 along with the flight plan and destination of ownship vehicle 2.

Radar system 4 includes phased-array radar device 10 and processing circuitry 20. Radar system 4 may also include other components not depicted in FIG. 1, such as a user interface configured to receive user inputs and present weather information and/or information relating to object 26. Radar system 4 may include memory device 28 configured to store data relating to weather and objects. Memory device 28 of radar system 4 may be configured to store expected characteristics of objects. Processing circuitry 20 may be configured to compare the actual characteristics of returned sensing signals 18B to the expected characteristics of objects stored in memory device 28.

Phased-array radar device 10 includes weather detection mode 12 and object detection mode 14. In weather detection mode 12, phased-array radar device 10 is configured to receive returned weather signals 16B. In object detection mode 14, phased-array radar device 10 is configured to receive returned sensing signals 18B. Phased-array radar device 10 is configured to interleave weather detection mode 12 and object detection mode 14 by alternating between receiving returned weather signals 16B and receiving returned sensing signals 18B. Processing circuitry 20 may be configured to control the active mode of phased-array radar device based on whether weather detection module 22 and object detection module 24 is active. In some examples, phased-array radar device 10 may be configured to simultaneously receive returned weather signals 16B and returned sensing signals 18B. In some examples, processing circuitry 20 may be configured to control the mode of phased-array radar device 10 by interleaving weather detection module 22 and object detection module 24, where processing circuitry 20 is configured to analyze received signals based on the operating module.

In weather detection mode 12, phased-array radar device 10 may be configured to transmit weather signals 16A to a volume of space outside of ownship vehicle 2. In some examples, weather signals 16A may be electromagnetic waves in the X band with frequencies of approximately eight Gigahertz to approximately twelve Gigahertz. In some examples, the frequency may be in the range of 9.32 to 9.4 Gigahertz. The signal frequency may also be thirteen Gigahertz, which may reduce the antenna aperture by three decibels. Weather signals 16A may travel away from phased-array radar device 10 and collide with objects such as water molecules and other particles in the volume of space. Phased-array radar device 10 may be configured to receive returned weather signals 16B. Phased-array radar device 10 may also be configured to store returned weather signals 16B in memory device 28 and/or transmit returned weather signals 16B to processing circuitry 20. In some examples, returned weather signals 16B may indicate the reflectivity of molecules and/or the presence of wind shear.

In object detection mode 14, phased-array radar device 10 may be configured to transmit sensing signals 18A to a volume of space outside of ownship vehicle 2. Sensing signals 18A may travel away from phased-array radar device 10 and collide with objects such as object 26, balloons, birds, terrain, and/or any other object. Phased-array radar device 10 may be configured to receive returned sensing signals 18B. Phased-array radar device 10 may also be configured to store returned sensing signals 18B in memory device 28 and/or transmit returned sensing signals 18B to processing circuitry 20. In some examples, returned sensing signals 18B may indicate the presence of objects such as object 26.

In some examples, phased-array radar device 10 may be configured to transmit weather signals 16A and sensing signals 18A at the same or similar frequencies. In some examples, phased-array radar device 10 may be configured to transmit signals of a single type, including weather signals 16A and sensing signals 18A, but treat the signals differently on return based on whether radar system 4 is operating in weather detection mode 12 or object detection mode 14. For example, if radar system 4 is operating in weather detection mode 12, processing circuitry 20 may be configured to analyze the returned signals (returned weather signals 16A) to determine reflectivity and/or wind shear. If object detection module 24 is active, processing circuitry 20 may be configured to analyze the returned signals (returned sensing signals 18A) to detect objects.

Phased-array radar device 10 may be configured to transmit and receive signals at different frequencies and with different modulation schemes, depending on the operating mode of phased-array radar device 10. For example, phased-array radar device 10 may be configured to change modulation schemes, azimuth sweeps, and elevation sweeps when phased-array radar device 10 changes operating mode between weather detection mode 12, wind shear detection mode (which may be a subset of weather detection mode 12), and object detection mode 14. Processing circuitry 20 may be configured to process returned signals differently depending on the operating mode. Wind shear detection mode may include fixed parameters, while weather detection mode 12 without wind shear detection and object detection mode 14 may include varying parameters based on circumstances such as clutter for urban areas versus clutter for rural areas.

Phased-array radar device 10 may be configured to transmit and receive signals at a specified frequency or within a frequency band. Phased-array radar device 10 may be configured to transmit and receive signals by using an antenna array. In some examples, the antenna array may include a one-dimensional line of antennas and/or a two-dimensional matrix of antennas. Phased-array radar device 10 may be configured to control the direction of a beam transmitted by the antenna array by controlling the phase shift across the antenna array. In some examples, phased-array radar device 10 may be configured to scan a volume of space in a relatively short amount of time, such as five seconds, two seconds, one second, or less than one second. In contrast, radar device with only a mechanically scanning element may scan the same volume of space in a much longer period of time.

In some examples, phased-array radar device 10 may include additional functionality, such as the ability to transmit and receive surveillance signals. Processing circuitry 20 may be configured to cause phased-array radar device 10 to transmit surveillance signals indicating the location and direction of travel of ownship vehicle 2. In some examples, the surveillance signals may include ADS-B signals. Processing circuitry 20 may be configured to analyze surveillance signals received by phased-array radar device 10 from object 26.

Processing circuitry 20, when weather detection module 22 is active, is configured to determine weather conditions based on returned weather signals 16B. Processing circuitry 20, when object detection module 24 is active, is also configured to detect objects based on returned sensing signals 18B. Depending on the active mode or operating mode, processing circuitry 20 may be configured to analyze returned signals 16B and 18B differently. Processing circuitry 20 may be configured to analyze the amplitude, the frequency, the time, and/or the phase shift of returned signals 16B and 18B. In some examples, processing circuitry 20 may be configured to determine the distance to an object or molecule based on the time between transmission and receipt. In some examples, processing circuitry 20 may be configured to determine the direction of travel and velocity of the object or molecule based on the difference in frequency between a transmitted signal and a returned signal according to the Doppler effect. By Doppler processing, processing circuitry 20 may differentiate object 26 from mainlobe clutter. In some examples, processing circuitry 20 may be configured to determine the size of the object based on the amplitude and quantity of the returned signals. In some examples, processing circuitry 20 may be configured to determine the angle of the object relative to the antenna array of phased-array radar device 10 based on the phase shift in the returned signals received by the antenna array.

Object 26 may be any mobile object or remote object such as an aircraft such as a helicopter or a weather balloon, or object 26 may be a space vehicle such as a satellite or spaceship. In yet other examples, object 26 may include a land vehicle such as an automobile or a water vehicle such as a ship or a submarine. Object 26 may be a manned vehicle or an unmanned vehicle, such as a drone, a remote-control vehicle, or any suitable vehicle without any pilot or crew on board. In some examples, object 26 may or may not be configured to transmit surveillance signals, such as ADS-B, to inform ownship vehicle 2 of the location and direction of travel of object 26. Object 26 may also be a weather balloon or an animal such as a bird.

Processing circuitry 20 may be configured to store expected characteristics of object 26 in memory device 28. The expected characteristics may include size, shape, maximum speed, data relating to blade flash, and/or any other characteristics of object 26. Processing circuitry 20 may be configured to detect object 26 based on returned sensing signals 18B by at least comparing the actual characteristics of returned sensing signals 18B to the expected characteristics stored in memory device 28.

In some examples, object 26 may be a UAV with low reflectivity because object 26 may include a plastic surface. The size of object 26 may be similar to a medium-sized bird. In some examples, the blade of the propellers of object 26 may be too small for phased-array radar device 10 to detect, especially if the blades are plastic. The target radar cross section for the body of object 26 may be negative twenty decibels for a square meter of surface area. The target radar cross section for the blades of object 26 may be lower than negative twenty decibels for a square meter of surface area.

In accordance with the techniques of this disclosure, radar system 4 may be configured to interleave weather detection module 22 and object detection module 24. By interleaving the two modes, radar system 4 may determine weather conditions and detect objects without the need for another radar system on ownship vehicle 2 to perform these operations. Radar system 4 may interleave the two modes at a sufficiently fast rate, such that radar system 4 is configured to quickly report changes in weather conditions and object positions and movements. In some examples, the interleaving rate may be greater than one per two seconds, such that phased-array radar device 10 may complete a full cycle through weather detection mode 12 and object detection mode 14 in less than two seconds. In contrast, a radar system with only a mechanically scanning element may be slower in determining weather conditions and detecting objects.

Figure 2:
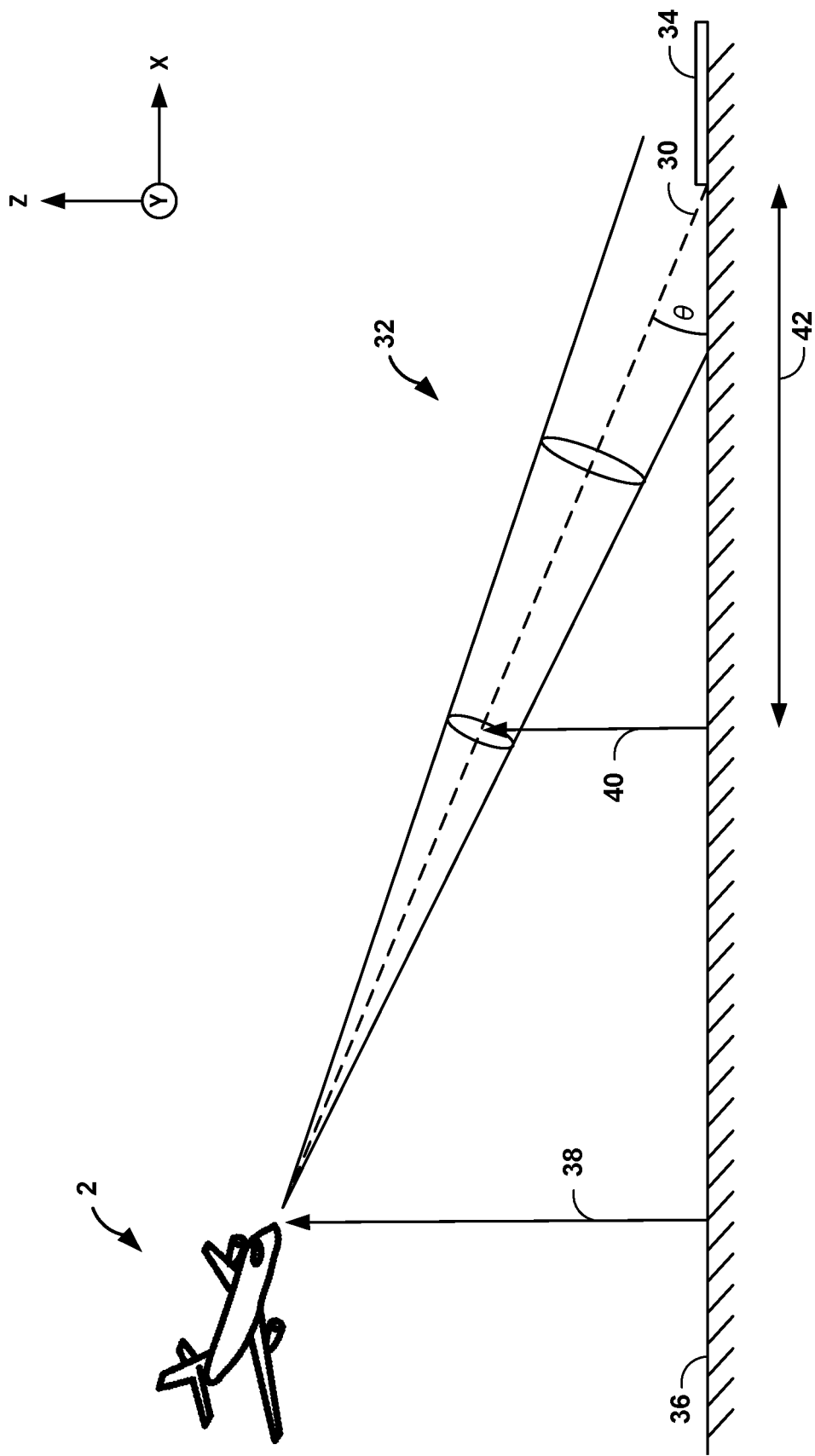
FIG. 2 is a side view of the ownship vehicle including a phased-array radar device transmitting an elevation beam, while on a downward glide slope, in accordance with some examples of this disclosure.

FIG. 2 is a side view of ownship vehicle 2 including phased-array radar device 10 transmitting an elevation beam 32, while on downward glide slope 30, in accordance with some examples of this disclosure. Ownship vehicle 2 is traveling in the x-axis direction and may be preparing to land at runway 34 by descending in the z-axis direction from altitude 38 above ground surface 36 to the level of runway 34. In some examples, the angle θ of downward glide slope 30 may be three degrees, as measured between downward glide slope 30 and ground surface 36.

Altitude 40 may be two thousand feet above ground surface 36. Below altitude 40, radar system 4 onboard ownship vehicle 2 may be configured to detect wind shear. Wind shear is a serious issue for landing vehicles because the wind near ground surface 36 may be highly variable and may differ significantly from the wind at higher altitudes. Within distance 42 of runway 34, radar system 4 may be configured to detect wind shear. In some examples, radar system 4 may interleave a wind shear module (i.e., weather detection module 22) and object detection module 24 below two thousand feet.

Figure 3A:
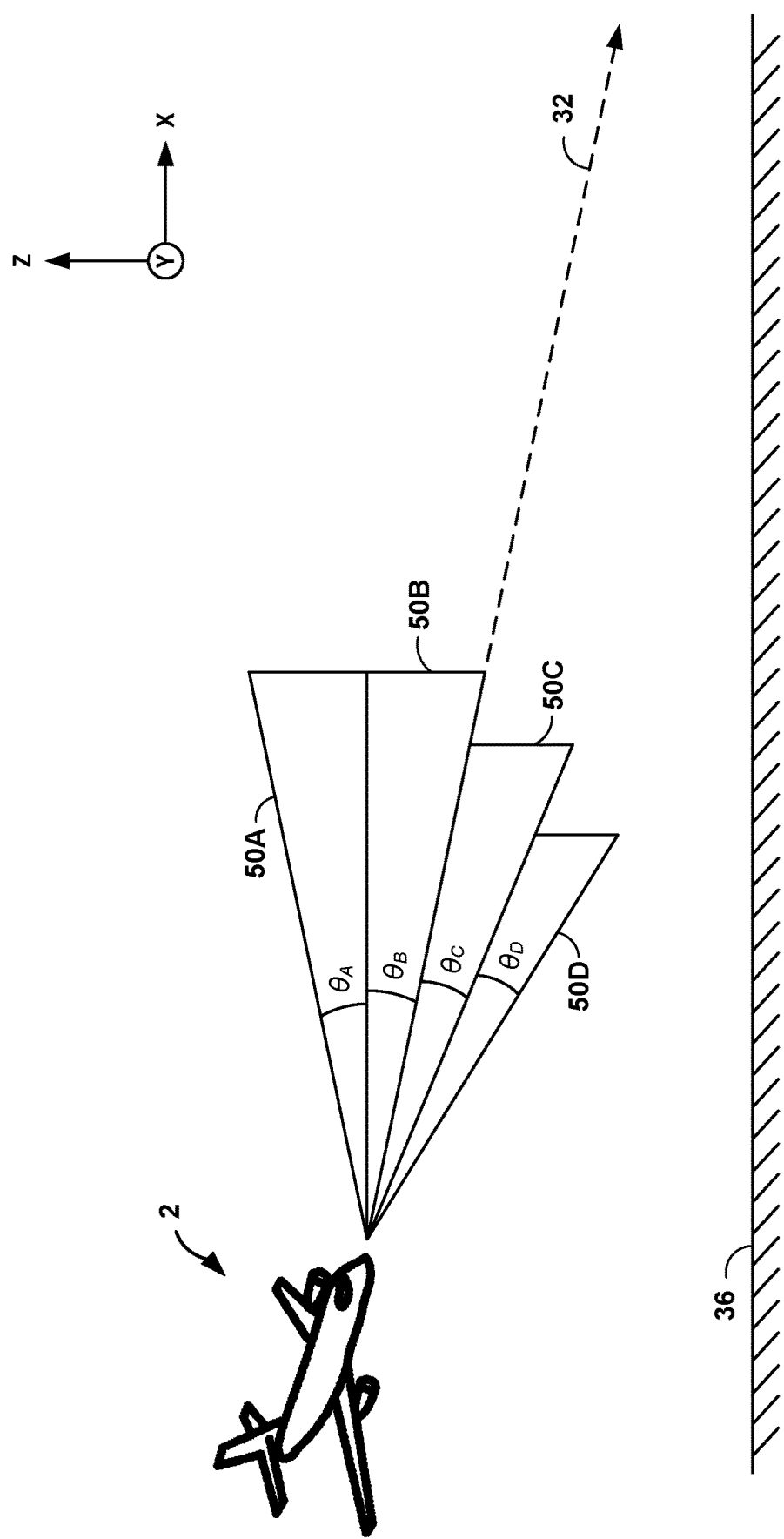
FIG. 3A is a side view of the ownship vehicle including a phased-array radar device transmitting four elevation beams, while on a downward glide slope, in accordance with some examples of this disclosure.
Figure 3B:
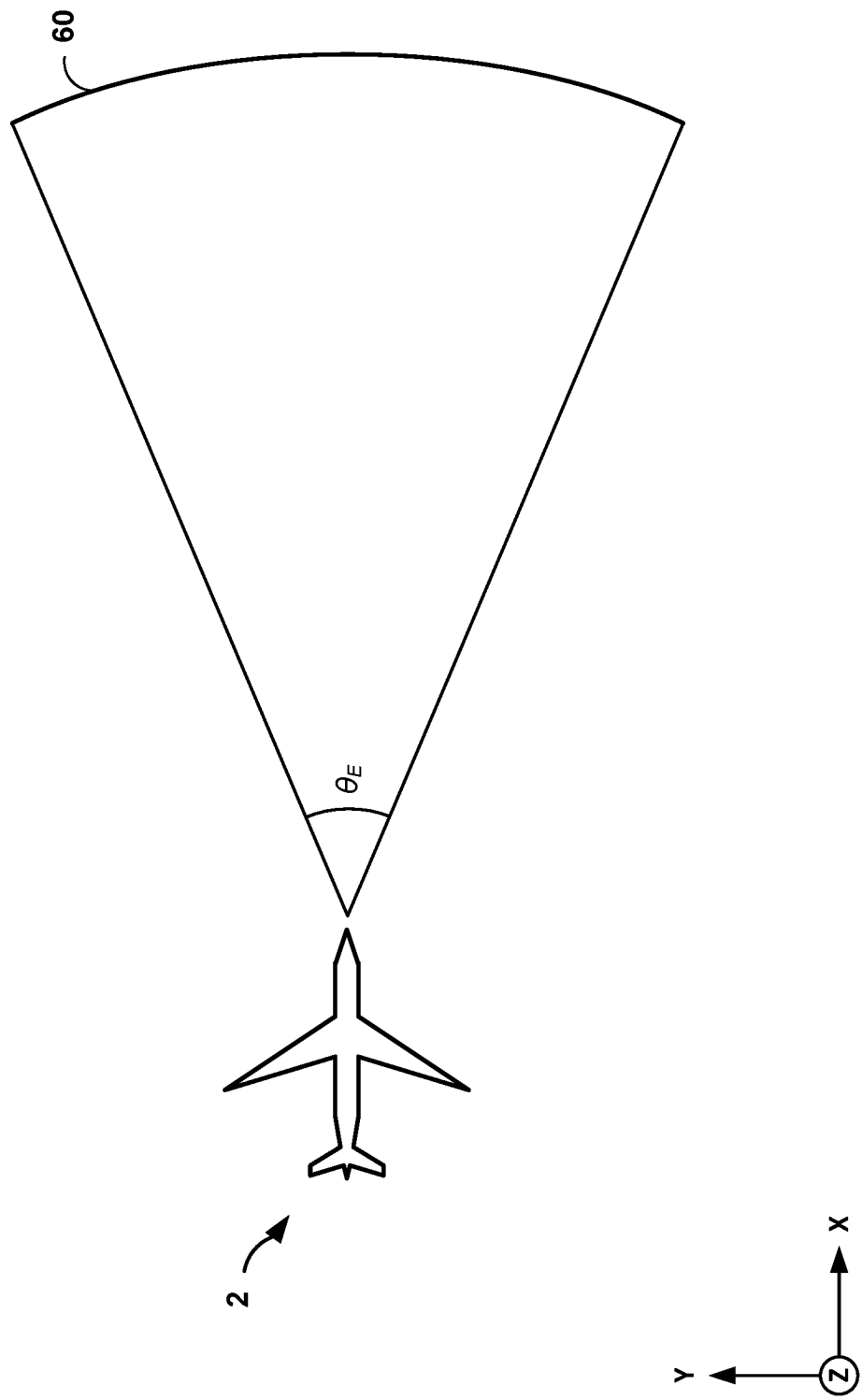
FIG. 3B is a top view of the ownship vehicle including a phased-array radar device transmitting an azimuth beam, in accordance with some examples of this disclosure.

FIG. 3A is a side view of ownship vehicle 2 including phased-array radar device 10 transmitting four elevation beams 50A-50D, while on downward glide slope 30, in accordance with some examples of this disclosure. Each of elevation beams 50A-50D may have an elevation angle $\theta_A$-$\theta_D$ measured in the x-z plane. Each of elevation beams 50A-50D may also extend in the y-axis direction, as depicted in FIG. 3B.

In some examples, each of elevation angles $\theta_A$-$\theta_D$ is three degrees, such that elevation beam 50A is centered on an angle of 4.5° above downward glide slope 30, elevation beam 50B is centered on an angle of 1.5° above downward glide slope 30, elevation beam 50C is centered on an angle of 1.5° below downward glide slope 30, and elevation beam 50D is centered on an angle of 4.5° below downward glide slope 30. Phased-array radar device 10 may transmit elevation beams 50A and 50B (i.e., upper elevation beams) at angles higher than downward glide slope 30 and elevation beams 50C and 50D (i.e., lower elevation beams) at angles lower than downward glide slope 30. Phased-array radar device 10 may transmit elevation beams 50A-50D by transmitting electromagnetic signals from an antenna array with a phase shift across the antenna array. The angle of each beam may be based on the amount of phase shift of the electromagnetic signals across the antenna array.

Phased-array radar device 10 and/or processing circuitry 20 may establish the range of a beam by determining a time duration for receiving the returned signals. The transmitted signals and returned signals may travel at a known speed, so the time duration may correspond to a round-trip distance for the transmitted signals and returned signals. Processing circuitry 20 may determine a range based on the altitude and slope of ownship vehicle 2 and convert the range to a time duration (see Tables I and II below). Phased-array radar device 10 may transmit a beam and receive returned signals for the time duration. If phased-array radar device 10 receives a returned signal after the expiration of the time duration, phased-array radar device 10 and/or processing circuitry 20 may not process the returned signals for weather conditions or objects. Instead, processing circuitry 20 may be configured to process only the returned signals that phased-array radar device receives within the time duration after transmission. The minimum range in a pulsed mode may depend on the time that the transmitter is on for the narrowest pulse. Alternatively or additionally, phased-array radar device 10 may be configured to operate in frequency-modulated continuous wave (FMCW) mode. In FMCW mode, phased-array radar device 10 may be configured to measure the time delay between a transmitted frequency slope and a received frequency slope.

Phased-array radar device 10 may be configured to transmit elevation beams 50A and 50B with substantially the same range in the x-axis direction. Phased-array radar device 10 may be configured to transmit elevation beam 50C with a shorter range in the x-axis direction, as compared to elevation beams 50A and 50B. Phased-array radar device 10 may be configured to transmit elevation beam 50D with a shorter range in the x-axis direction, as compared to elevation beams 50A-50C. Processing circuitry 20 may be configured to determine a shorter range for elevation beams 50C and 50D to avoid detecting objects or terrain on ground surface 36.

Processing circuitry 20 may be configured to determine the ranges of elevation beams 50A-50D based on the altitude of ownship vehicle 2, based on the distance to a runway, and/or based the slope of ownship vehicle 2 (i.e., whether ownship vehicle 2 is ascending, descending, or staying at the same altitude). Processing circuitry 20 may be configured to determine the ranges of the elevation beams further based on the distance from ownship vehicle 2 to a runway when ownship vehicle 2 is preparing to land or has recently taken off. Beyond a threshold distance from the runway, processing circuitry 20 may be configured to establish an equal range for each of the elevation beams transmitted by phased-array radar device 10. When ownship vehicle 2 is less than the threshold distance from the runway, processing circuitry 20 may be configured to determine a shorter range for lower elevation beams, such as elevation beams 50C and 50D.

Phased-array radar device 10 may be configured to generate a signal-to-noise ratio (SNR) and signal-to-clutter ratio (SCR) as a function of the range of elevation beams 50A-50D and the direction of flight. In some examples, the range of elevation beams 50A-50D may be limited by the SNR and/or SCR. When determining a range for each of elevation beams 50A-50D, phased-array radar device 10 may not consider the clutter "flash" that results from an electromagnetic wave reflecting from the ground at a ninety-degree angle. In some examples, the minimum SNR may be negative ten decibels, and the minimum SCR may be positive ten decibels.

In some examples, phased-array radar device 10 may have the following specifications: a pulse length of three microseconds such that the blind range is four hundred and fifty meters, or about seven seconds of flight time at one hundred and forty miles per hour (i.e., about two hundred and twenty-five kilometers per hour); a minimum pulse repetition interval (PRI) of 1.054 milliseconds and a maximum pulse repetition frequency (PRF) of nine hundred and forty-nine Hertz; thirty-four pulses on target within the main beam, for a processing gain of 15.3 decibels; and a single pulse detection probability of ninety percent; probability of false alarms of one in one million. The pulse length may be reduced to one hundred nanoseconds in object detection mode 14, assuming ten Megahertz sampling. The pulse length may be variable based on the altitude of ownship vehicle 2.

In some examples, elevation beams 50A-50D may be object sensing signals, such as sensing signals 18A and 18B. Processing circuitry 20 may determine elevation angles $\theta_A$-$\theta_D$ and the ranges of elevation beams 50A-50D based on the speed of ownship vehicle 2 and maximum vertical and horizontal speeds of objects. For example, if ownship vehicle 2 is traveling two hundred miles per hour (i.e., about ninety meters per second), and object 26 has a maximum vertical speed of thirteen miles per hour (e.g., about six meters per second), processing circuitry 20 may be configured to determine the angles and ranges of elevation beams 50A-50D to detect objects that may pose a threat of collision to ownship vehicle 2.

FIG. 3B is a top view of ownship vehicle 2 including phased-array radar device 10 transmitting an azimuth beam 60, in accordance with some examples of this disclosure. In some examples, azimuth beam 60 may extend in the x-y plane, where the x-axis direction and the y-axis direction are horizontal directions. Azimuth beam 60 may be one of elevation beams 50A-50D, such that azimuth beam 60 has a dimension in the z-axis direction. Each of elevation beams 50A-50D may have an azimuth component, such that elevation beams 50A-50D may extend in the y-axis direction.

In some examples, azimuth angle $\theta_E$ may be thirty degrees, forty degrees, or fifty degrees. The azimuth slew rate of phased-array radar device 10 may be ninety degrees per second. Processing circuitry 20 may be configured to determine azimuth angle $\theta_E$ based on the speed of ownship vehicle 2 and the maximum speed of object 26. In some examples, the maximum horizontal speed of object 26 may be higher than the maximum vertical speed of object 26, such that azimuth angle $\theta_E$ may be larger than the sum of elevation angles $\theta_A$-$\theta_D$ in order to detect objects that are threats to collide with ownship vehicle 2. For example, the sum of elevation angles $\theta_A$-$\theta_D$ may be twelve degrees, and azimuth angle $\theta_E$ may be forty degrees to account for a higher maximum horizontal speed and a lower maximum vertical speed of object 26. In some examples, maximum horizontal speed of object 26 may be forty-five miles per hour (e.g., twenty meters per second), and the maximum vertical speed of object 26 may be thirteen miles per hour (e.g., six meters per second).

Figure 4:
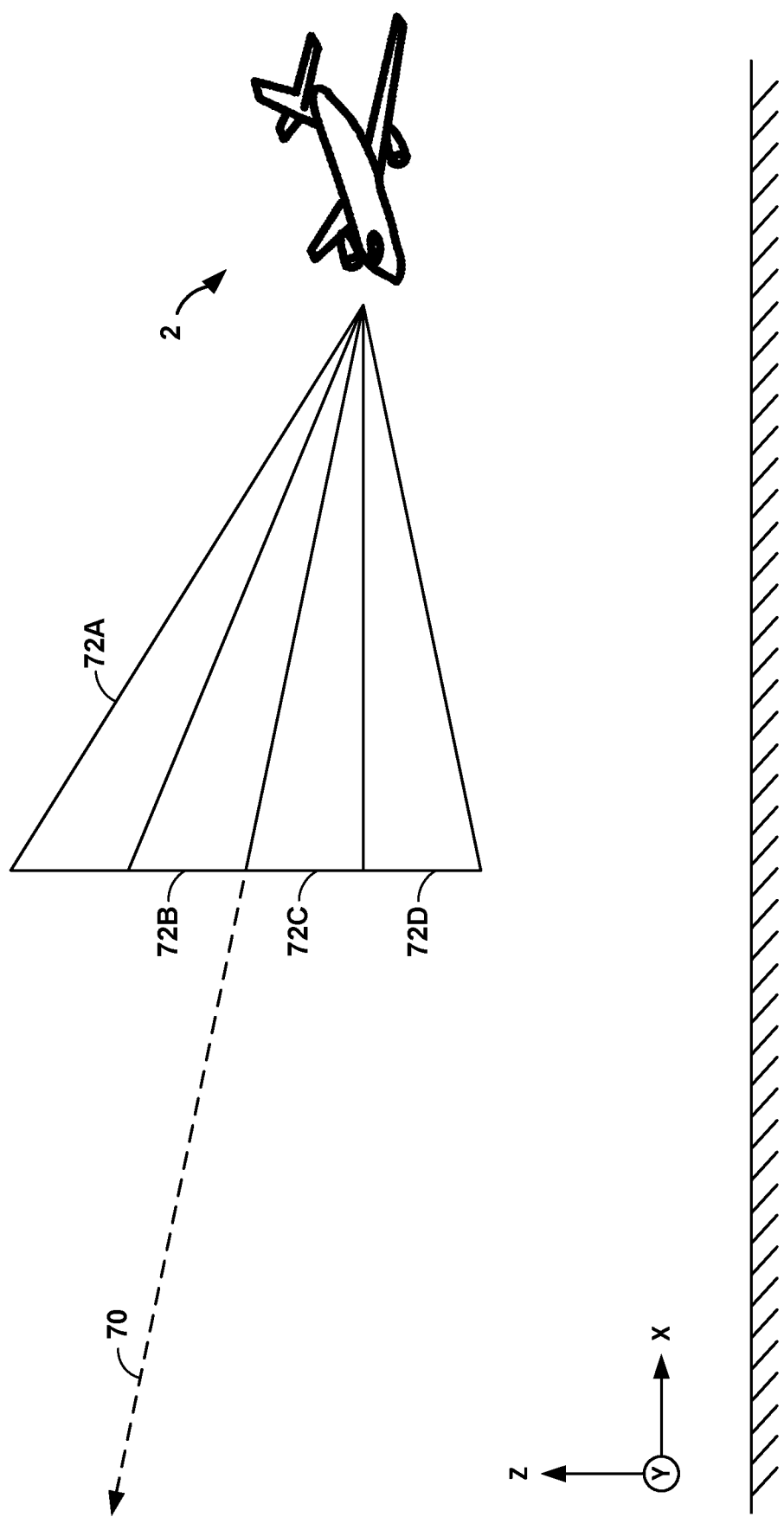
FIG. 4 is a side view of the ownship vehicle including a phased-array radar device transmitting four elevation beams, while taking off, in accordance with some examples of this disclosure.

FIG. 4 is a side view of ownship vehicle 2 including phased-array radar device 10 transmitting four elevation beams 72A-72D, while taking off, in accordance with some examples of this disclosure. Processing circuitry 20 may determine the same range for each of elevation beams 72A-72D based on the altitude, speed, and ascending slope 70 of ownship vehicle 2. In some examples, if ownship vehicle 2 is higher than a threshold altitude, processing circuitry 20 may be configured to determine the same range for each of elevation beams 72A-72D. If ownship vehicle 2 is higher than a threshold altitude, processing circuitry 20 may be configured to determine shorter ranges for one or both of elevation beams 70C and 70D.

Table I includes example ranges for phased-array radar device 10. Table II include example ranges for distances to a runway for landing and takeoff.

TABLE I

Detection range based on distance to a runway.

| Distance to runway (nautical miles (nm) and kilometers) | Object detection range (nm and km) | Time to interception (sec) | Comments |
|---|---|---|---|
| 15 (27.78 km) | 1.40 (2.59) | 42 | PRF variable in lower scan beam to limit clutter |
| 10 (18.52) | 1.50 (2.78) | 44 | PRF variable in lower scan beam to limit clutter |
| 7 (12.96) | 1.20 (2.22) | 37 | PRF variable in lower scan beam to limit clutter & pulse width (PW) to put more energy on target |
| 3 (5.56) | 0.70 (1.3) | 22 | PRF & PW interleaved with wind shear mode |
| 1 (1.85) | 0.22 (0.407) | 7 | PRF & PW interleaved with wind shear mode |

TABLE II

Detection ranges of elevation beams based on distance to a runway.

| Distance to runway (nm) | Landing or takeoff | Range of elevation beam 50A or 72A | Range of elevation beam 50B or 72B | Range of elevation beam 50C or 72C | Range of elevation beam 50D or 72D |
|---|---|---|---|---|---|
| 15 (27.78 km) | Landing | 3.3 nm (6.11 km) | 1.4 nm (2.59) | 2.0 nm (0.37) | 1.7 nm (3.1) |
| 10 (18.52) | Landing | 2.7 (5) | 1.5 (2.78) | 1.5 (2.78) | 1.5 (2.78) |
| 7 (12.96) | Landing | 1.5 (2.78) | 1.5 (2.78) | 1.2 (2.22) | 1.3 (2.4) |
| 3 (5.56) | Landing | 1.9 (3.5) | 1.3 (2.4) | 0.9 (1.67) | 0.7 (1.3) |
| 1 (1.85) | Landing | 0.6 (1.1) | 0.4 (0.74) | 0.3 (0.55) | 0.2 (0.37) |
| 15 (27.78) | Takeoff | 3.3 (6) | 3.3 (6) | 3.3 (6) | 1.4 (2.59) |
| 10 (18.52) | Takeoff | 3.3 (6) | 3.3 (6) | 2.7 (5) | 1.5 (2.78) |
| 7 (12.96) | Takeoff | 3.3 (6) | 2.4 (4.4) | 1.9 (3.5) | 1.2 (2.22) |
| 3 (5.56) | Takeoff | 1.8 (3.3) | 1.8 (3.3) | 1.4 (2.59) | 0.7 (1.3) |
| 1 (1.85) | Takeoff | 0.6 (1.1) | 1.0 (1.85) | 0.7 (1.3) | 0.5 (0.93) |

The time to interception for the examples in Tables I and II may be at least thirty second at four nautical miles (e.g., about 7.4 km) to the runway and seven to eighteen seconds at one nautical mile (e.g., about 1.85 km) to the runway.

Figure 5:
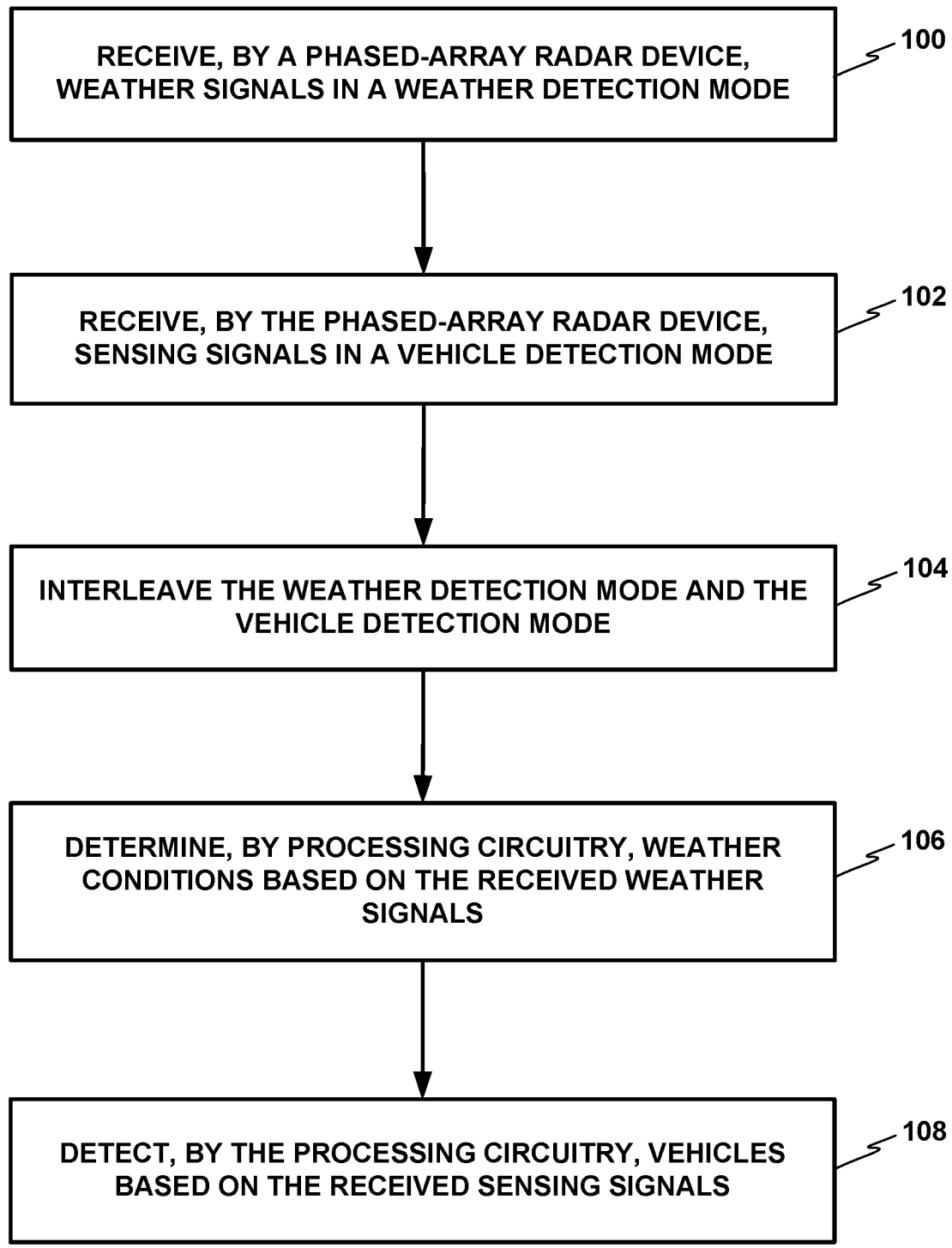
FIG. 5 shows a flowchart for an example technique for interleaving weather detection mode and object detection mode, in accordance with some examples of this disclosure.

FIG. 5 shows a flowchart for an example technique for interleaving weather detection mode and object detection mode, in accordance with some examples of this disclosure. Processing circuitry 20 may be configured to cause a phased-array radar device 10 to operate in a weather detection mode and the object detection mode based on whether the weather detection module or the object detection module is active. The technique of FIG. 5 is described with reference to the system of FIG. 1, including radar system 4, although other components may perform similar techniques.

The technique of FIG. 5 includes receiving, by phased-array radar device 10, weather signals in weather detection mode 12 (100). In weather detection mode 12, phased-array radar device 10 may be configured to transmit weather signals 16A to a volume of space outside of ownship vehicle 2. Weather signals 16A may travel away from phased-array radar device 10 and collide with objects such as water molecules and other particles in the volume of space. Phased-array radar device 10 may be configured to store returned weather signals 16B in memory device 28 and/or transmit returned weather signals 16B to processing circuitry 20. In some examples, returned weather signals 16B may indicate the reflectivity of molecules and/or the presence of wind shear. Phased-array radar device 10 may include a wind shear mode for altitudes below two thousand feet in weather detection mode 12. At altitudes of more than two thousand feet above the ground surface, phased-array radar device 10 may be configured to detect reflectivity in weather detection mode 12.

The technique of FIG. 5 further includes receiving, by phased-array radar device 10, sensing signals in object detection mode 14 (102). In object detection mode 14, phased-array radar device 10 may be configured to transmit sensing signals 18A away from phased-array radar device 10 to collide with objects such as object 26, balloons, birds, terrain, and/or any other objects. Phased-array radar device 10 may be configured to store returned sensing signals 18B in memory device 28 and/or transmit returned sensing signals 18B to processing circuitry 20. In some examples, returned sensing signals 18B may indicate the presence of objects such as object 26. Phased-array radar device 10 may be configured to transmit sensing signals 18A and receive returned sensing signals 18B even at altitudes of less than two thousand feet above a ground surface.

The technique of FIG. 5 further includes interleaving weather detection mode 12 and object detection mode 14 (104). Phased-array radar device 10 is configured to interleave weather detection mode 12 and object detection mode 14. Processing circuitry 20 may be configured to interleave weather detection module 22 and object detection module 24, where processing circuitry 20 may be configured to cause phased-array radar device 10 to operate in weather detection mode 12 or object detection mode 14 based on whether weather detection module 22 is active or object detection module 24 is active.

The technique of FIG. 5 further includes determining, by processing circuitry 20, weather conditions based on received weather signals 16B (106). Processing circuitry 20 is configured to determine weather conditions based on returned weather signals 16B when weather detection module 22 is active. Processing circuitry 20 may be configured to analyze returned weather signals 16B to determine the reflectivity for volumes of space outside of ownship vehicle 2. The reflectivity may indicate clouds and/or precipitation. Processing circuitry 20 may also be configured to analyze returned weather signals 16B to determine wind shear conditions.

The technique of FIG. 5 further includes detecting, by processing circuitry 20, object 26 based on the received sensing signals 18B (108). Processing circuitry 20 is also configured to detect objects based on returned sensing signals 18B when object detection module 24 is active. Processing circuitry 20 may be configured to analyze returned sensing signals 18B to detect object 26. In some examples, processing circuitry 20 may be configured to determine the size, speed, and direction of travel of object 26. Processing circuitry 20 may be configured to detect object 26 even without any blade flash from a propeller or spinning object on object 26. In some examples, however, processing circuitry 20 may be configured to detect object 26 based on blade flash, in order to distinguish object 26 from ground clutter and/or other objects.

In some examples, the technique of FIG. 5 may further include generating an output in response to detecting object 26. The output may be an alert signal such as an audible alert, a visual alert, and/or any other alert signal. The alert signal may cause an audio device to generate a noise. The alert signal may also cause a visual device to display a blinking light, display a color, display an image of object 26, and/or any other visual display. The alert signal may be a transmitted alert signal to another vehicle, a base station, a satellite, and/or any other receiver.

FIGS. 6A-15 depict example hardware configurations for phased-array radar device 10. In some examples, phased-array radar device 10 may be configured to operate in FMCW and/or pulsed mode. Additionally or alternatively, phased-array radar device 10 may also include other hardware configurations. Example details of phased-array radar devices may be found in U.S. patent application Ser. No. 14/488,129 filed on Sep. 16, 2014, entitled "Digital Active Array Radar" and U.S. patent application Ser. No. 14/488,154 filed on Sep. 16, 2014, entitled "Digital Active Array Radar," which are incorporated herein by reference in their entirety.

Figure 6A:
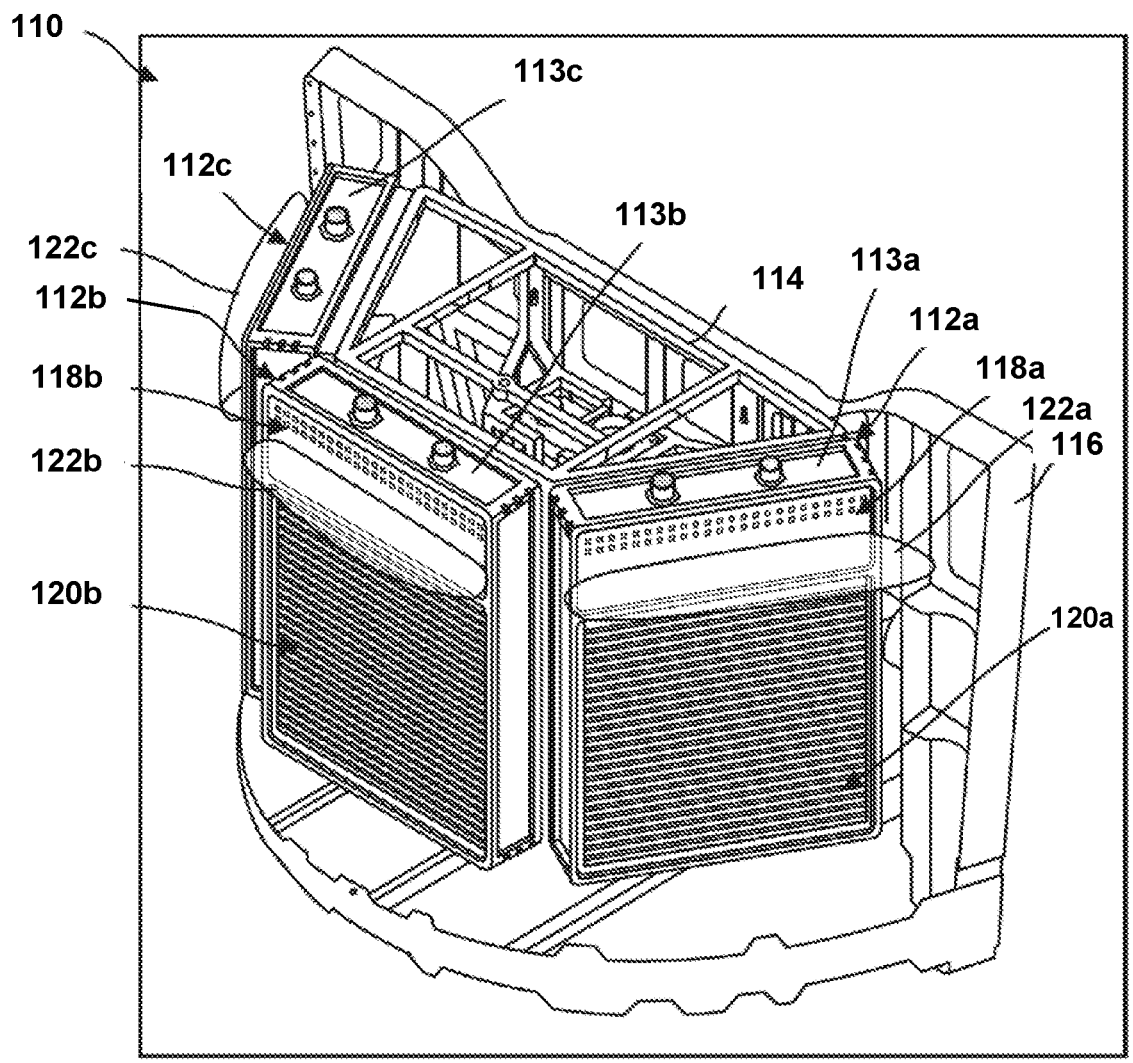
FIGS. 6A and 6B are conceptual and schematic diagrams illustrating an example FMCW radar system including a plurality of FMCW radar arrays.
Figure 6B:
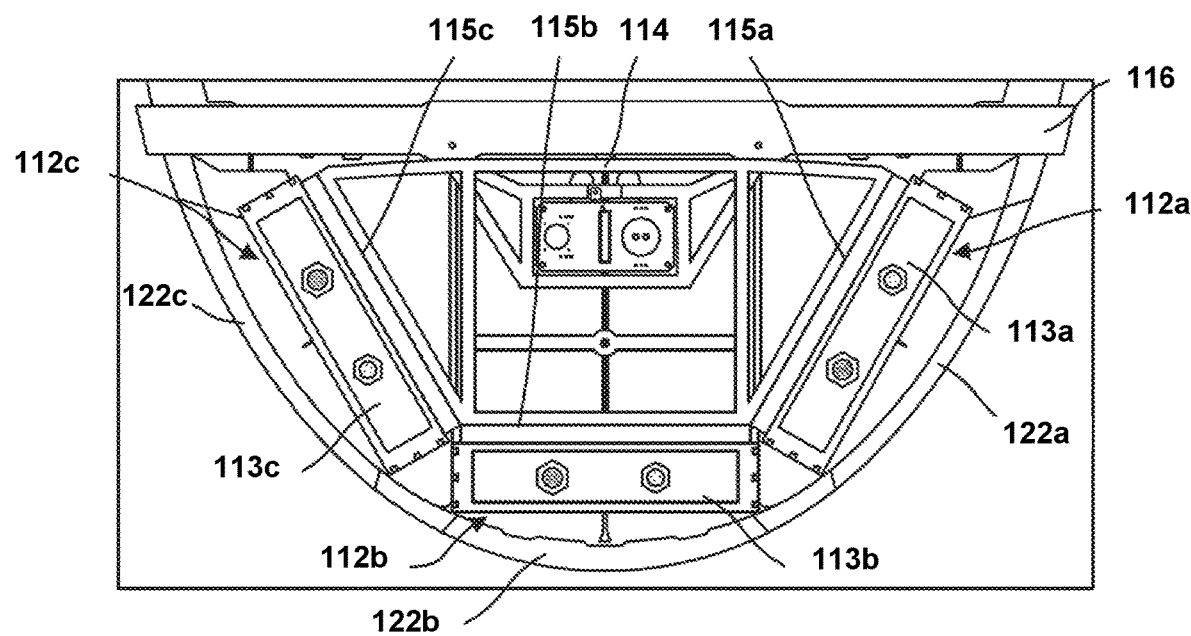

FIGS. 6A and 6B are conceptual and schematic diagrams illustrating an example radar system 110 including a plurality of FMCW radar arrays 112a-112c (collectively, "FMCW radar arrays 112"). In the illustrated example, radar system 110 includes a first FMCW radar array 112a, a second FMCW radar array 112b, and a third FMCW radar array 112c. In other examples, radar system 110 may include any other number of FMCW radar arrays 112, such as at least one FMCW radar array 112 or a plurality of FMCW radar arrays 112. Each FMCW radar array includes a respective one of housings 113a-113c (collectively, "housings 113"), a respective one of transmit arrays 118a-118c (collectively, "transmit arrays 118"), and a respective one of receive arrays 120a-120c (collectively, "receive arrays 120"). Each one of transmit arrays 118 includes a respective transmit antenna including a plurality of transmit antenna elements. Similarly, each one of receive arrays 120 includes a respective receive antenna including a plurality of receive antenna elements.

For example, first FMCW radar array 112a includes a first transmit array 118a and a first receive array 120a, second FMCW radar array 112b includes a second transmit array 118b and a second receive array 120b, and third FMCW radar array 112c includes a third transmit array (not shown in FIGS. 6A and 6B) and a third receive array (not shown in FIGS. 6A and 6B). In this way, as radar system 110 includes three FMCW radar arrays 112, radar system 110 includes three transmit arrays 118 and three receive arrays 120.

For each of FMCW radar arrays 112, a respective one of transmit arrays 118 and a respective one of receive arrays 120 are mechanically attached or coupled to a respective one of housings 113. For example, first transmit array 118a and first receive array 120a are mechanically attached to first housing 113a. Similarly, second transmit array 118b and second receive array 120b are mechanically attached to second housing 113b, and third transmit array 118c and third receive array 120c are mechanically attached to third housing 113c. In some examples, as shown in FIG. 6A, each of housings 113 may include two sidewalls, two end walls, and a back wall. Each of housings 113 generally defines a rectangular box, with one side (the front side) being substantially open. The front side of each of housings 113 may be substantially open, exposing the transmit antenna elements and receive antenna elements (see FIG. 7).

In the example illustrated in FIGS. 6A and 6B, each of the FMCW radar arrays 112 are mechanically coupled to a radar system frame 114, which is mechanically coupled to a frame 116 of the aircraft on which the radar system 110 is used. In other examples, at least one of the FMCW radar arrays 112 may be mechanically coupled directly to frame 116 of the aircraft on which the radar system 110 is used.

Figure 6C:
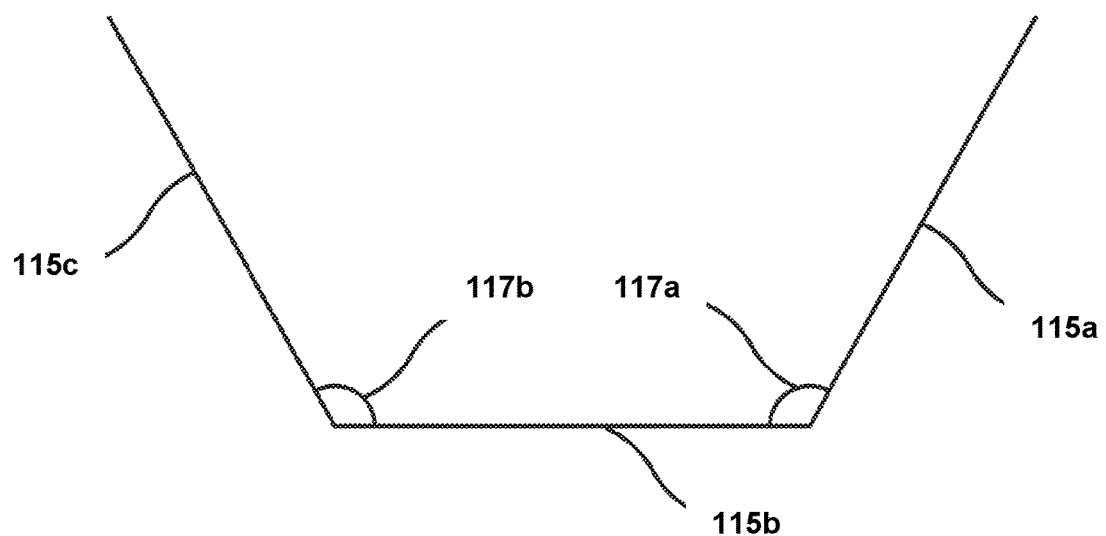
FIG. 6C is a simplified conceptual diagram illustrating back surfaces of housings of FMCW radar arrays.

As shown in FIGS. 6A and 6B, back surfaces 115a-115c (collectively, "back surfaces 115") of housings 113a-113c may be mechanically attached or coupled to supports of frame 114. Frame 114 may be shaped to position housings 113a-113c relative to each other. For example, FIG. 6C is a simplified conceptual diagram illustrating back surfaces 115 of housings 113. As shown in FIG. 6C, the three back surfaces 115 of housings 113 are disposed at angles with respect to each other. Interior angles 117a and 117b may be defined between the first back surface 115a and second back surface 115b, and between the second back surface 115b and third back surface 115c. In some examples, interior angles 117a and 117b may be the same. In other examples, interior angles 117a and 117b may be the same. Interior angles 117a and 117b may be between about 90° and about 180°. In some examples, one or both of interior angles 117a and 117b may be about 120°.

By arranging housings 113 at angles with respect to each other in, the transmit array/receive array pairs (e.g., first transmit array 118a and first receive array 120a, second transmit array 118b and second receive array 120b, and third transmit array 118c and third receive array 120c) are disposed at angles with respect to each other. This may allow radar system 110 to monitor a greater range in azimuth more efficiently than using only a single transmit array/receive array pair. For example, each transmit array/receive array pair may be configured to scan a predetermined window with a predetermined extent in azimuth and elevation. In some examples, the predetermined extent in azimuth may be about ±40° from the plane orthogonal to the face of the transmit array/receive array pair or about ±38° in azimuth. As the three transmit array/receive array pairs are disposed at angles with respect to each other and the predetermined window for each transmit array/receive array pair may overlap with the predetermined window for the adjacent transmit array/receive array pair(s), radar system 110 may allow a total azimuth scan area of between about 220° and about 228° in some examples. The total azimuth scan area may depend at least in part on an overlap in azimuth between scan areas of the three FMCW radar arrays 112.

Each of FMCW radar arrays 112 also includes a slotted choke 122a, 122b, 122c (collectively, "slotted chokes 122"). The respective slotted chokes 122 are disposed between a respective one of the transmit antennas 118 and a respective one of the receive antennas 120 in a transmit array/receive array pair. Slotted chokes 122 may be formed of an electrically conductive material or formed of an electrically insulating material coated with an electrically conductive material. Each of slotted chokes 122 may define a plurality of slots, which are sized, shaped, and/or placed to attenuate strength of electromagnetic radiation output by a respective one of the transmit antennas at the adjacent one of the receive antennas. Further details of slotted chokes 122 will be described below with respect to FIG. 15.

Figure 7:
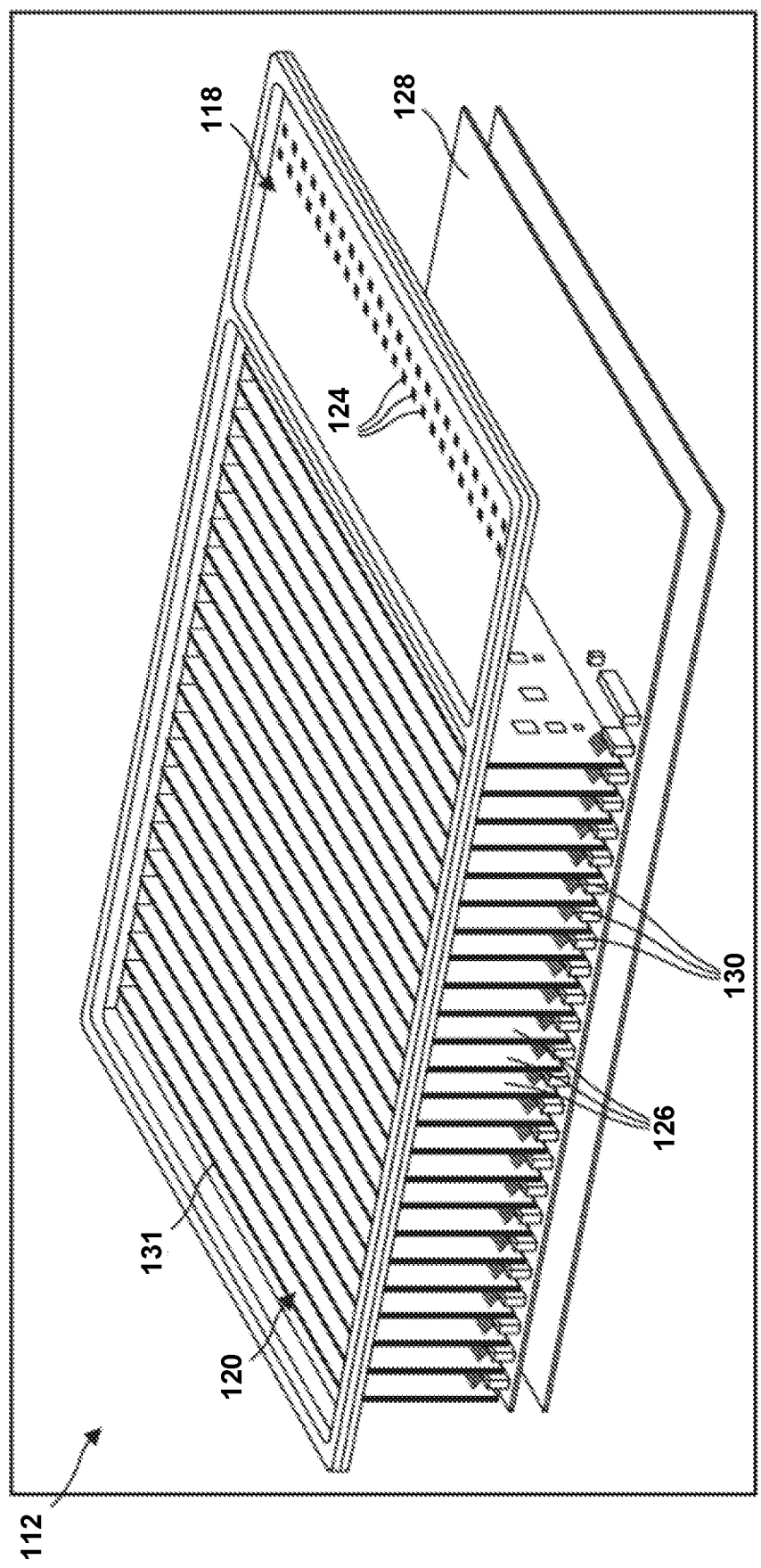
FIG. 7 is a conceptual and schematic diagram illustrating an example FMCW radar array.

Each of transmit arrays 118 includes a transmit antenna including a plurality of transmit antenna elements. FIG. 7 is a conceptual and schematic diagram illustrating an example FMCW radar array, e.g., one of FMCW radar arrays 112. The conceptual and schematic diagram of FIG. 7 illustrates additional example details of FMCW radar arrays 112 shown in FIGS. 6A-6C. FMCW radar array 112 includes a transmit array 118 and a receive array 120. Transmit array 118 includes a transmit antenna including a plurality of transmit antenna elements 124. In some examples, the plurality of transmit antenna elements 124 may be disposed in a plurality of rows, where the number of transmit antenna elements 124 in each respective row is the same. In some examples, the number of transmit antenna elements 124 in a single row is greater than the number of rows in the transmit antenna. In this way, in some examples, the transmit antenna may be wider than it is tall, and the transmit beam formed by the transmit antenna may be larger in elevation than in azimuth, such as forming an elliptical shape that is taller than it is wide. In some examples, this may allow the transmit beam to cover substantially the entire elevation of the predetermined window in a single scan, as described below with reference to FIG. 9.

In other examples, the number of transmit antenna elements 124 in a single row is less than the number of rows in the transmit antenna. In this way, in some examples, the transmit antenna may be taller than it is wide, and the transmit beam formed by the transmit antenna may be larger in azimuth than in elevation, such as forming an elliptical shape that is wider than it is tall. In some examples, this may allow the transmit beam to cover substantially the entire azimuth of the predetermined window in a single scan, as described below with reference to FIG. 9.

In general, the number of transmit antenna elements 124 in a first transmit array dimension (e.g., width or height) may be greater than the number transmit antenna elements 124 in a second transmit array dimension (e.g., height or width). The first transmit array dimension may be substantially perpendicular to the second transmit array dimension. A transmit antenna that includes a greater number of transmit antenna elements in the first transmit array dimension than in the second transmit array dimension may produce a transmit beam that is elongated in a first illumination dimension compared to a second, substantially perpendicular illumination dimension. Although the remainder of this description describes examples in which the transmit antenna includes more transmit antenna elements 124 in a single row that the number of rows of transmit antenna elements 124, a person having ordinary skill in the art will understand that the first and second transmit array dimensions may be any substantially perpendicular dimensions, and that the first and second illumination dimensions are based on the first and second transmit array dimensions.

Figure 8:
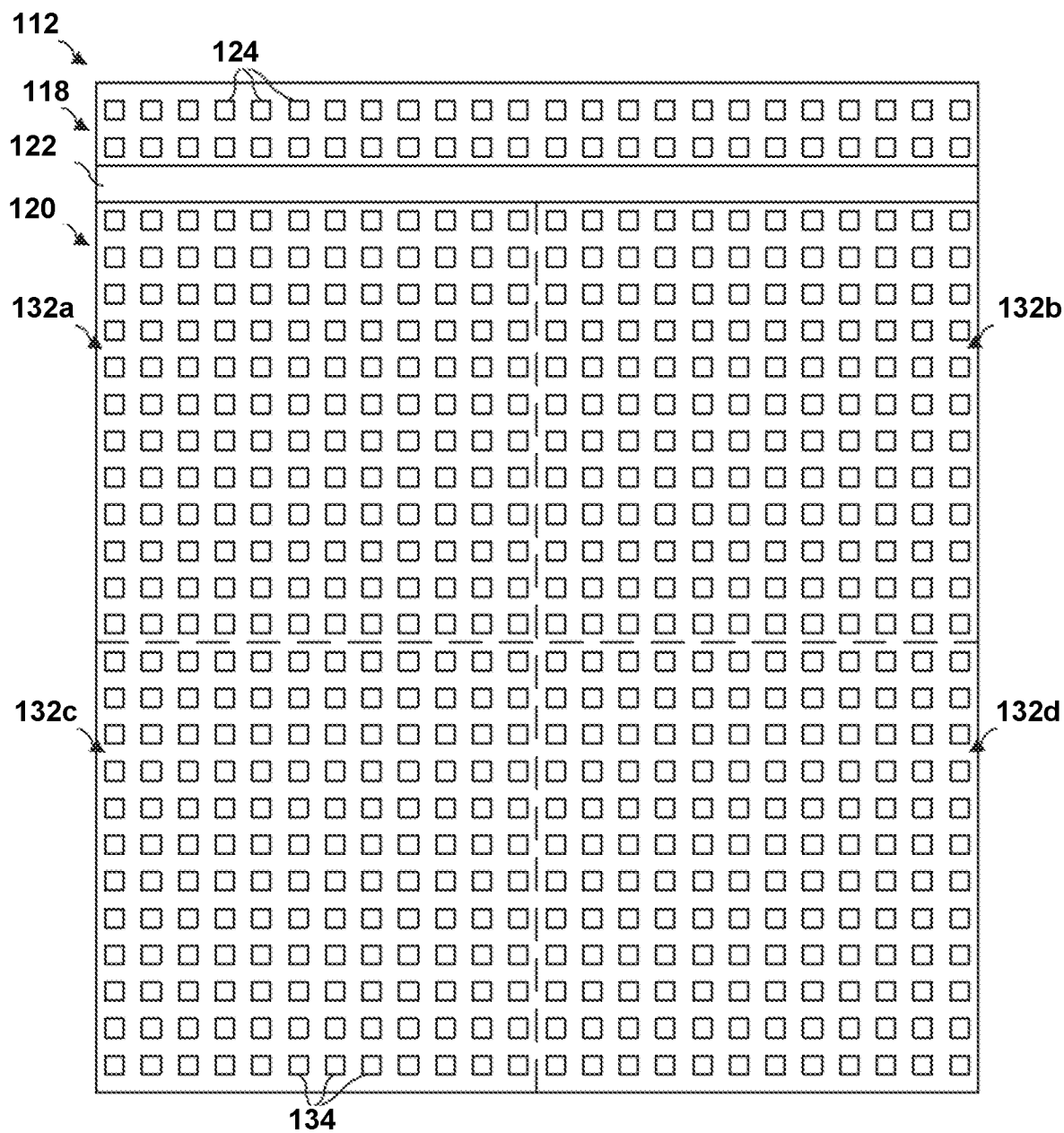
FIG. 8 is a conceptual diagram illustrating an example FMCW radar array.

In the example illustrated in FIGS. 6A-6C and 7, the transmit antenna includes two rows of transmit antenna elements 124, and each row includes twenty-four transmit antenna elements 124. However, in other examples, the transmit antenna may include one row or more than two rows of transmit antenna elements 124, and each row of the transmit antenna may include more or fewer than twenty-four transmit antenna elements 124. In general, the transmit antenna may include at least one row of transmit antenna elements 124, and each row may include a plurality of transmit antenna elements 124. Alternatively, or additionally, transmit antenna elements 124 may not be arranged in rows and columns as depicted in FIG. 8; instead, transmit antenna elements 124 may be arranged in another geometric or non-geometric array. In some examples, transmit antenna elements 124 may include aperture coupled microstrip patches.

FMCW array 112 also includes a receive array 120 including a plurality of printed boards 126 on which or in which at least some of the electronics and receive antenna elements of receive array 120 are disposed. Each of printed boards 126 is connected to a master interconnect board 128 by a respective one of connectors 130. Master interconnect board 128 may be mechanically attached or coupled to housing 113 (FIGS. 6A and 6B), e.g., to a back wall of housing 113.

Each of printed boards 126 includes a plurality of receive antenna elements. Although the receive antenna elements are not illustrated in FIG. 7, the receive antenna elements are located adjacent to the top edge 131 of each of the respective printed boards 126. In some examples, the receive antenna elements may be radiating dipoles. In some examples, the receive antenna elements may be aperture coupled microstrip patches. In other examples, receive array 120 may include another physical configuration, such as receive antenna elements that are not adjacent to top edge 131 of each of the respective printed boards 126, more or fewer printed boards 126, or a construction similar to transmit array 118, in which a plurality of receive antenna elements are mounted on or formed in a major surface of a printed board or other substrate.

FIG. 8 is a conceptual diagram illustrating another conceptual view of an example FMCW radar array 112. As in the example of FIG. 7, FMCW radar array 112 includes a transmit array 118 and a receive array 120. Similar to each of FMCW radar arrays 112 shown in FIGS. 6A and 6B, the example of FMCW radar array 112 shown in FIG. 8 also includes a mechanical choke 122 disposed between the transmit antenna and the receive antenna. Transmit array 118 and receive array 120 are physically proximate to each other, e.g., located in a single housing (housing 113 shown in FIGS. 6A and 6B).

Transmit array 118 includes a plurality of transmit antenna elements 124. In some examples, transmit array 118 includes two rows (oriented horizontally in the example of FIG. 8) of transmit antenna elements 124, and each row includes twenty-four transmit antenna elements 124. In general, transmit array 118 may include at least one row of transmit antenna elements 124, and each row may include a plurality of antenna elements 124. In some examples, adjacent transmit antenna elements 124 may be spaced apart in the horizontal direction by approximately one-half of the wavelength of the transmit beam generated using transmit array 118.

As shown in FIG. 8, receive array 120 may be conceptually divided into quadrants 132a, 132b, 132c, 132d (collectively, "quadrants 132"). In some examples, receive array 120 is also electrically divided into quadrants 132, e.g., based on the electrical connections of the receive antenna elements 134 to receive electronics that process the signals detected by receive antenna elements 134. Receive signals from each of receive array elements 134 may be used to generate monopulse tracking beams using monopulse beam arithmetic, and dividing receive array 120 into quadrants 132 may facilitate generation of monopulse tracking beams, as described below. In some examples, each of quadrants 132 includes the same number of receive antenna elements 134. For example, in the implementation shown in FIG. 8, each of quadrants 132 includes twelve rows of twelve receive antenna elements 134, for a total of 144 receive antenna elements 134 in each of quadrants 132 (each row is oriented horizontally and each column is oriented vertically in the example of FIG. 8). In other examples, each of quadrants 132 may include 10 rows of receive antenna elements 134, each row including 12 receive antenna elements 134 (for a total of 120 receive antenna elements in each of quadrants 132). Hence, in the illustrated example, receive array 120 includes twenty-four rows of receive antenna elements 134, and each row includes twenty-four receive antenna elements 134. In other examples, receive array 120 may include a different number of receive antenna elements 134. For example, receive array 120 may include more or fewer rows of receive antenna elements 134, and each row may include more or fewer receive antenna elements 134 than depicted in FIG. 8. In general, receive array 120 may include a plurality of rows of receive antenna elements 134 and each row may include a plurality of receive antenna elements 134. In some examples, adjacent receive antenna elements 134 may be spaced apart in the horizontal direction by approximately one-half of the wavelength of the transmit beam generated using transmit array 118.

In some examples, receive antenna elements 134 may be arranged in a square array of receive antenna elements 134 (e.g., the number of rows of receive antenna elements 134 is the same as the number of receive antenna elements 134 in each row). In other examples, receive antenna elements 134 may be arranged in a rectangular arrant of receive antenna elements 134 (e.g., the number of rows of receive antenna elements 134 is different than the number of receive antenna elements 134 in each row). Additionally or alternatively, in some examples, the number of receive antenna elements 134 in a row of receive array 120 may be different than the number of transmit antenna elements 124 in a row of transmit array 118. Alternatively, or additionally, receive antenna elements 134 may not be arranged in rows and columns as depicted in FIG. 8; instead, receive antenna elements 134 may be arranged in another geometric or non-geometric array.

Figure 9:
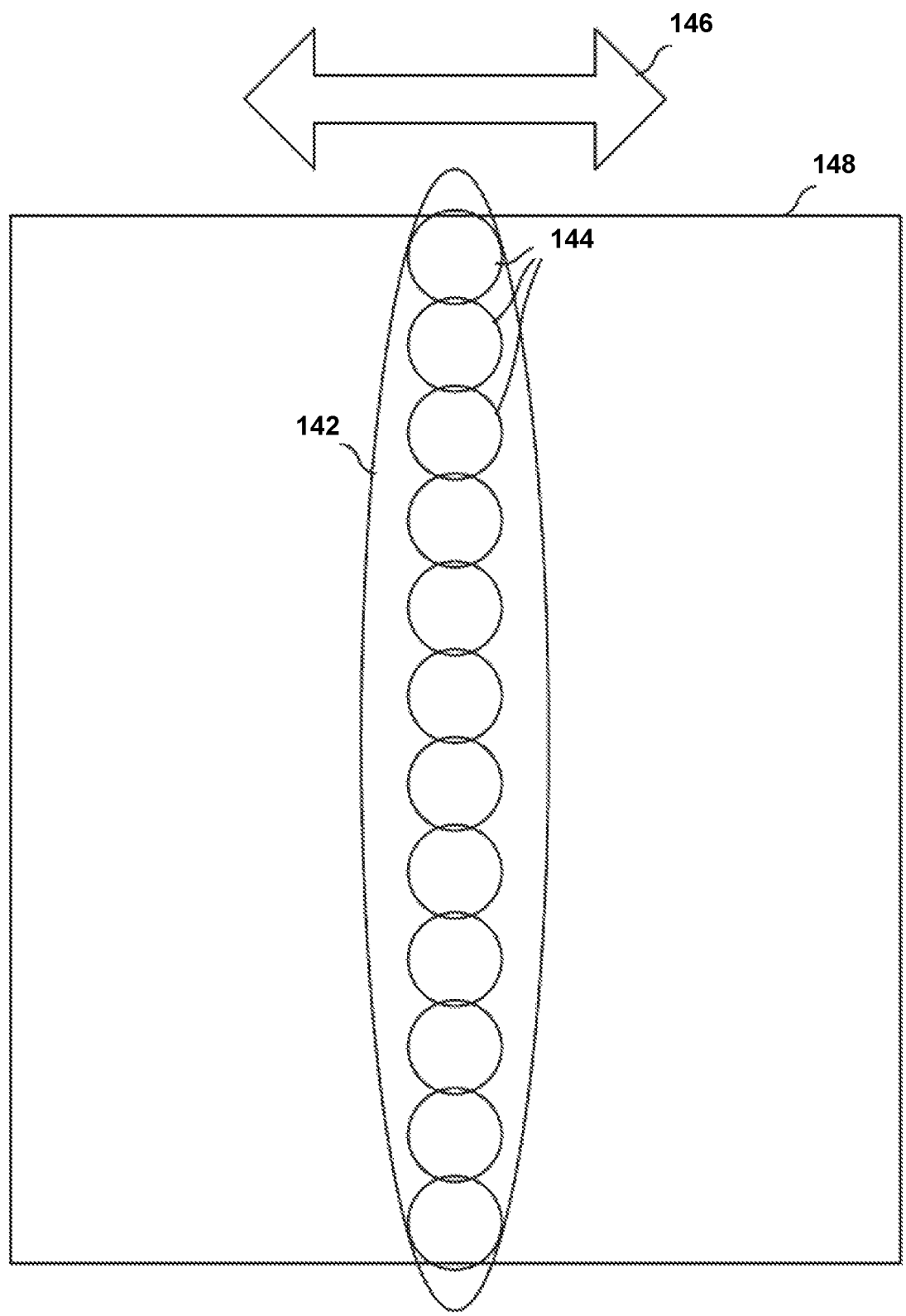
FIG. 9 is a conceptual diagram illustrating an example transmit beam and a plurality of example receive beams.

FIG. 9 is a conceptual diagram illustrating an example transmit beam 142 and a plurality of example receive beams 144, which may be generated using transmit array 118 and receive array 120. Transmit beam 142 is depicted as being approximately elliptical in shape, with a greater extent in elevation than in azimuth. FIG. 9 also depicts a representation of a predetermined area 148 which is to be illuminated by FMCW array 112 (FIGS. 6A-8). As shown in FIG. 9, transmit beam 142 may be at least as tall in elevation as the elevation of predetermined area 148, such that transmit beam 142 illuminates the entire elevation of a section of predetermined area 148 without steering or scanning transmit beam 142 in elevation. In other examples, as described above, transmit beam 142 may be wide in azimuth and short in elevation. In general, transmit beam 142 may have a greater extent in a first illumination direction than in a second illumination dimension substantially perpendicular to the first illumination dimension.

A transmit electronics module associated with transmit array 118 may be configured to scan, or steer, transmit beam 142 in azimuth (e.g., the second illumination dimension), as indicated by arrow 146. In some examples, the transmit electronics module may be configured to apply a phase shift to each transmit antenna element of the plurality of transmit antenna elements 124 (FIG. 8) which changes as a function of time, which results in transmit beam 142 being scanned in azimuth.

A receive electronics module associated with receive array 120 is configured to electronically generate the plurality of receive beams 144. Although twelve receive beams 144 are illustrated in FIG. 9, in other examples, the receive electronics module may be configured to generate more or fewer receive beams 144 using receive array 120. For example, the receive electronics module associated with receive array 120 may be configured to generate at least two receive beams 144.

In some examples, the receive electronics module associated with receive array 120 is configured to scan, or steer, each of the plurality of receive beams 144 in the second illumination dimension (e.g., azimuth) in parallel with transmit beam 142. For example, the receive electronics module associated with receive array 120 may be configured to scan, or steer, each of the plurality of receive beams 144 in the second illumination dimension (e.g., azimuth) such that the plurality of receive beams 144 are scanned at the same rate and to corresponding locations so that the plurality of receive beams 144 are substantially always (e.g., always or nearly always) located within the area illuminated by transmit beam 142.

In some examples, the receive electronics module associated with receive array 120 may be configured to scan, or steer, the plurality of receive beams in the second illumination dimension (e.g., azimuth) by applying a phase shift to the signals received from each respective receive antenna element of the plurality of receive antenna elements 134. The receive electronics associated with receive array 120 then may process the phase-shifted signals as described below to produce phase-shifted and summed I and Q values for each row of receive antenna elements 134 in each respective quadrant of quadrants 132 (FIG. 8). For example, when each row of receive antenna elements 134 in each respective quadrant of quadrants 132 (FIG. 8) includes twelve elements, the receive electronics module associated with receive array 120 may be configured to generate a single phase-shifted and summed I value and a single phase-shifted and summed Q value for each row of twelve receive antenna elements 134 each time the receive array 120 is sampled.

The receive electronics module associated with receive array 120 also may be configured generate the plurality of receive beams 144 at predetermined first illumination dimension (e.g., elevation) positions by applying a complex beam weight to the phase-shifted and summed I and Q values for each row of each of quadrants 132 (FIG. 8). The phase-shifted and summed I and Q values determined by the receive electronics module for a single sample instance may be reused multiple times to generate the corresponding number or receive beams 144 at respective elevation positions. For example, to generate twelve receive beams 144, the receive electronics module associated with receive array 120 may apply twelve different complex beam weights to the phase-shifted and summed I and Q values for each row of each of quadrants 132 in twelve separate operations.

The plurality of complex beam weights may correspond to the number of receive beams 144. The values for each of the plurality of complex beam weights may be selected to result in the plurality of receive beams being generated at the respective predetermined elevation positions. As shown in FIG. 9, in some examples, the elevation positions of the plurality of receive beams 144 may be selected to substantially fully cover (e.g., fully cover or nearly fully cover) the elevation extent of the predetermined area 148 which is to be illuminated. In some examples, the adjacent ones of the plurality of receive beams 144 may partially overlap in elevation. In this way, the receive electronics associated with receive array 120 may generate a plurality of receive beams 144 at predetermined first illumination dimension (e.g., elevation) positions and scan, or steer, the plurality of receive beams 144 in the second illumination dimension (e.g., azimuth).

Additionally, because receive array 120 is conceptually (and, optionally, electrically) divided into quadrants 132, the receive electronics module associated with receive array 120 may be configured to generate monopulse tracking beams. This may be used to facilitate tracking of objects by radar system 110. By generating a transmit beam 142 and a plurality of receive beams 144, radar system 110 may perform monopulse tracking for each of receive beams 144, which may facilitate tracking multiple objects within predetermined area 148. For example, by digitally combining the I and Q values for the two left quadrants 132*a* and 132*c* together, digitally combining the I and Q values for the two right quadrants 132*b* and 132*d*, and determining the difference between I and Q values for the two left quadrants 132a and 132c and the I and Q values for the two right quadrants 132b and 132d, the receive electronics module may create an azimuth monopulse tracking beam. Similarly, in some examples, by digitally combining the I and Q values for the top two quadrants 132a and 132b, and digitally combining the I and Q values for the bottom two quadrants 132c and 132d, and determining the difference between I and Q values for the two top quadrants 132a and 132b and the I and Q values for the two bottom quadrants 132c and 132d, the receive electronics module may create an elevation monopulse tracking beam. In some examples, by digitally combining the I and Q values for respective rows of all 4 quadrants 132, a reference sum beam may be created for comparison to the azimuth and elevation monopulse tracking beams. This may permit an accurate phase comparison monopulse to be created for each of receive beams 144. Additionally, as each of FMCW arrays 112 is configured to generate a transmit beam 142 and a plurality of receive beams 144, which are scanned within a corresponding predetermined window, this may facilitate tracking of multiple objects by radar system 110.

In some examples, instead of being associated with a single receive array 120, the receive electronics module may be associated with multiple receive arrays 120 (e.g., receive arrays 120a-120c shown in FIGS. 6A-6C). In other examples, a first portion of the receive electronics module may be associated with a single receive array, and a second portion of the receive electronics module may be associated with multiple receive arrays (e.g., receive arrays 120a-120c shown in FIGS. 6A-6C). For example, a portion of the receive electronics module that performs frequency downconversion and analog beam steering using phase shifts may be associated with a single array (e.g., receive array 120a of FIGS. 6A-6C), and each receive array may include a respective portion that performs frequency downconversion and analog beam steering using phase shifts. Continuing this example, a portion of the receive electronics module applies complex beam weight to the phase-shifted and summed I and Q values for each row of each of quadrants 132 to form the receive beams at predetermined elevation positions and form monopulse tracking beams may be associated with multiple receive arrays (e.g., receive arrays 120a-120c shown in FIGS. 6A-6C). In some examples, then, different portions of the receive electronics module may be conceptually associated with different receive arrays 120 or multiple receive arrays, physically associated with different receive arrays 120, may be physically separate from receive arrays 120, or the like.

Figure 10:
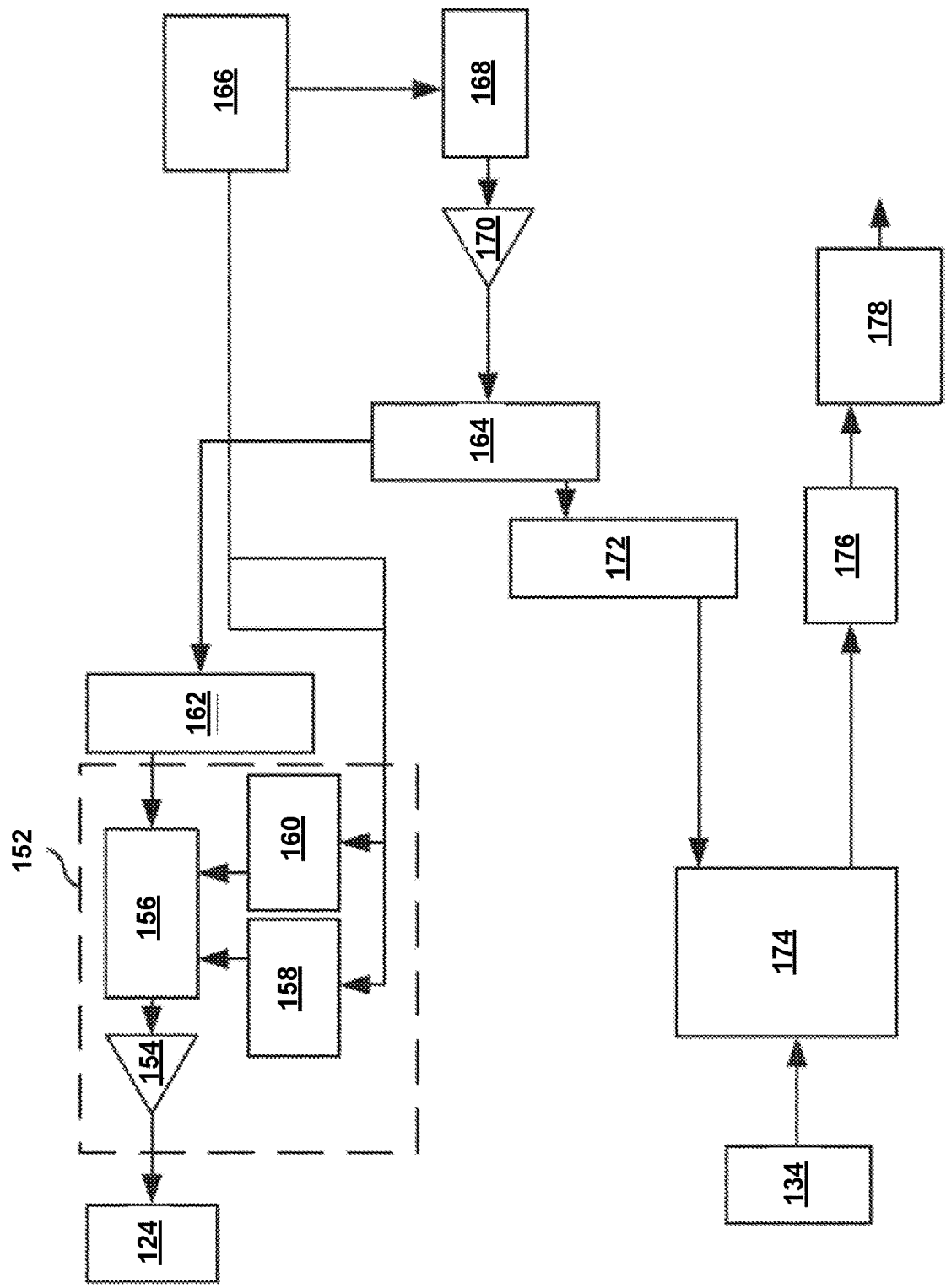
FIG. 10 is a conceptual block diagram illustrating an example FMCW radar array, including an associated transmit electronics module and an associated receive electronics module.

FIG. 10 is a conceptual block diagram illustrating an example FMCW radar array 112, including associated electronics modules. FMCW radar array 112 includes an array controller 166, which controls operation of FMCW radar array 112. Array controller 166 is operably coupled to a master radio frequency (RF) source and clock 168. Array controller 166 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Master RF source and clock 168 generates a base RF signal, for example, at a frequency of about 13 GHz. In some examples, master RF source and clock 168 may include a fractional N synthesizer. Master RF source and clock 168 is operably coupled to a power amplifier 170, which amplifies the base RF signal and outputs the amplified base RF signal to a power divider 164. Power amplifier 170 may amplify the base RF signal to overcome reduction in power as the base RF signal is divided for use in each receive signal and transmit signal. Power divider 164 is operably coupled to a first corporate feed 162, which is associated with a transmit array 118 (FIGS. 6A-8) and a second corporate feed 172, which is associated with a receive array 120 (FIGS. 6A-8).

Transmit electronics module 152 indicates electronics (e.g., power amplifier 154, image reject mixer (IRM) 156, direct digital synthesizer (DDS)-I 158, and DDS-Q 160) conceptually associated with a single transmit antenna element 124. FIG. 10 illustrates conceptually the components present for a transmit signal being sent to a single transmit antenna element 124. As described above with respect to FIGS. 6A-8, FMCW radar array 112 may include a plurality of transmit antenna elements 124. FMCW radar array 112 thus may include a plurality of transmit antenna elements 124 and a plurality of transmit electronics module 152 of FIG. 10.

In some examples, equivalent functionality for a plurality of transmit signals each being sent to a respective transmit antenna element 124 may be embodied in a single physical component. For example, a single power amplifier may include a plurality of channels, and each channel may be connected to a respective transmit antenna element. Hence, when embodied in a physical product, FMCW radar array 112 may include fewer components than those illustrated in FIG. 10, as functions of components may be combined and/or a single component may perform a function described with respect to FIG. 10 for multiple signals being sent to respective transmit antenna elements 124 or receive antenna elements 134.

Array controller 166 is operably connected to respective inputs of DDS-I 158 and DDS-Q 160, and instructs DDS-I 158 and DDS-Q 160 to generate a phase shift applied to respective intermediate frequency signals. For example, the intermediate frequency may be on the order of tens of megahertz (MHz), such as about 16 MHz, about 32 MHz, or about 64 MHz. DDS-I 158 and DDS-Q 160 output the phase-shifted signals to IRM 156. IRM 156 receives both the phase-shifted signals from DDS-I 58 and DDS-Q 160 and the base RF signal from first corporate feed 162. IRM 156 combines the base RF signal and the phase shifted intermediate frequency signals from DDS-I 158 and DDS-Q 160 to produce two phase shifted RF signals, which have frequencies of the base RF signal plus and minus the intermediate frequency, respectively. IRM 156 also attenuates one of the two phase-shifted RF signals and outputs the other of the two phase shifted RF signals to the power amplifier 154. Power amplifier 154 amplifies the phase shifted RF signal and outputs the signal to transmit antenna element 124.

As described above, the transmit beam generated by transmit antenna element 124 and the other transmit antenna elements 124 in the transmit array 118 (FIGS. 6A-8) may be electronically steered by applying a phase shift to the RF signal output by the transmit antenna elements 124, where the phase shift changes as a function of time. As shown in FIG. 10, the phase shift is generated by DDS-I 158 and DDS-Q 160 under control of array controller 166. Array controller 166 may linearly change the phase shift generated by DDS-I 158 and DDS-Q 160 to linearly scan the transmit beam 142 (FIG. 9) in azimuth. Because the phase shift is generated at intermediate frequency rather than RF, the phase shift operation may be more efficient, and thus may utilize smaller power amplifiers 154 compared to when the phase shift is implemented at RF. DDS-I 158 and DDS-Q 160 also may provide linear frequency modulation. In some examples, the phase shift applied by DDS-I 158 and DDS-Q 160 may be changed at most once per frequency modulation period. In some examples, to cause the transmit beam to dwell at a particular position, DDS-I 158 and DDS-Q may change the phase shift less often, e.g., after multiple frequency modulation periods having a given phase shift.

Turning now to the receive portion of FMCW radar array 112, each of receive antenna elements 134 is coupled to an analog receive electronics module 174. FIG. 10 illustrates conceptually the components present for a receive signal being received by a single receive antenna element 124. As described above with respect to FIGS. 6A-8, FMCW radar array 112 may include a plurality of receive antenna elements 134. Although a single receive antenna element 134 and a single analog receive electronics module 174 are depicted in the example of FIG. 10, in implementation, receive array 120 includes a plurality of receive antenna elements 134 (FIG. 8). FMCW radar array 112 thus may include a plurality of receive antenna elements 134 and a plurality of analog receive electronics module 174 or a single analog receive electronics module configured to perform the operations described with respect to analog receive electronics module 174 on each of a plurality of receive signals.

However, in some examples, equivalent functionality for a plurality of receive signals each being sent to a respective receive antenna element 134 may be embodied in a single physical component. Hence, when embodied in a physical product, FMCW radar array 112 may include fewer components than those illustrated in FIG. 10, as functions of components may be combined and/or a single component may perform a function described with respect to FIG. 10 for multiple signals being sent to respective receive antenna elements 134.

Figure 11:
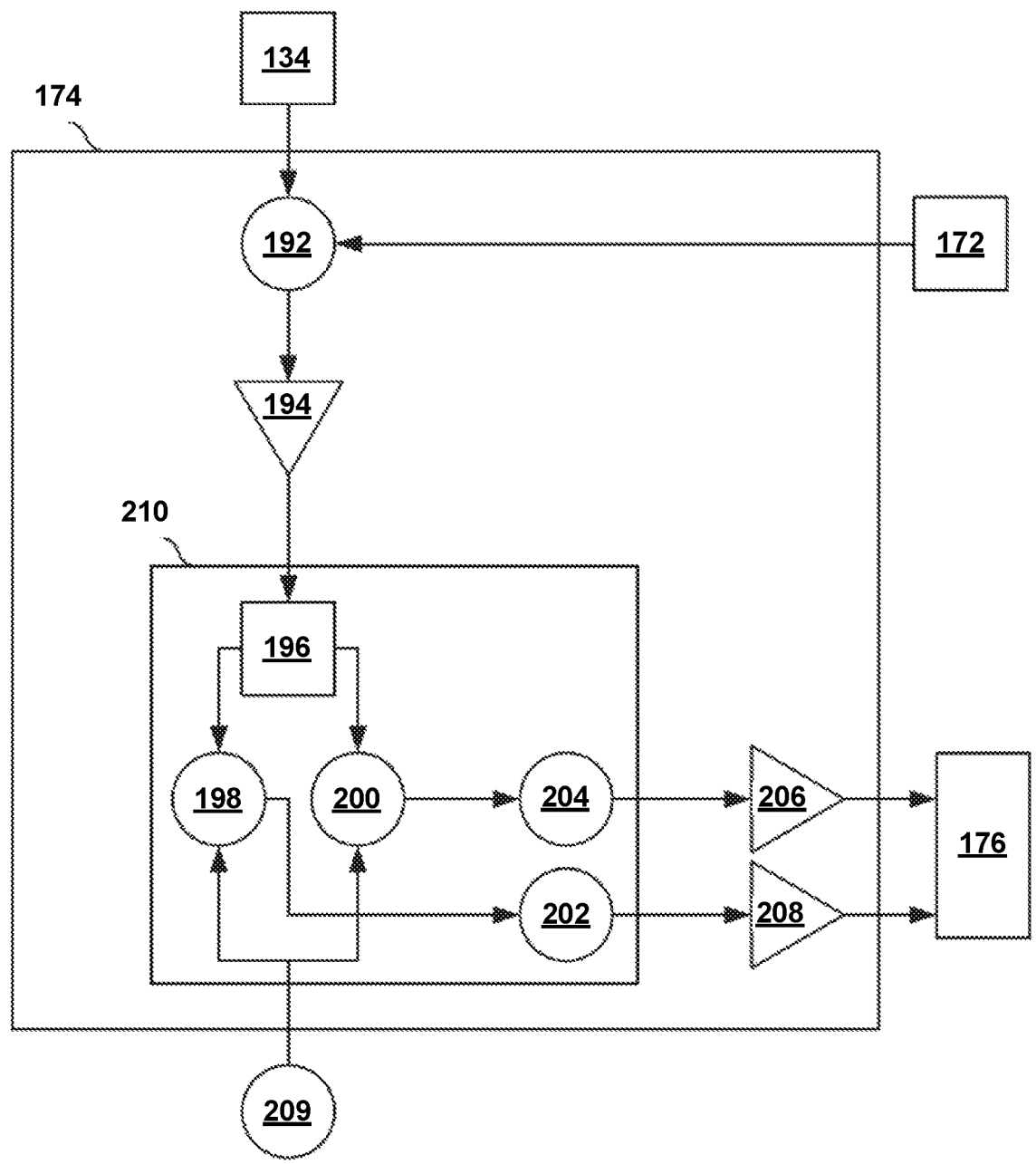
FIG. 11 is a conceptual block diagram illustrating an example receive antenna and associated receive electronics module.

Analog receive electronics module 174 receives the receive signal from receive antenna elements 134 and also receives a base band signal from a second corporate feed 172. Receive mixer combines the receive signal and the base band signal and outputs the combined signal to a power amplifier 176. FIG. 11 is a conceptual block diagram illustrating an example receive antenna element 134 and an example of analog receive electronics module 174. In the example illustrated in FIG. 11, analog receive electronics module 174 includes a receiver mixer 192, a low noise amplifier (LNA) 194, a quadrature mixer 210, and summing operational amplifiers 206 and 208. Receiver mixer 192 is operably coupled to receive antenna element 134 and receives a signal directly from receive antenna element 134, with no intervening amplifiers. Intervening amplifiers between receive antenna element 134 and receiver mixer 192 may raise the noise floor of the receiver, due to use of FMCW radar and simultaneous transmit and receive. Receiver mixer 192 also receives a signal from second corporate feed 172, which is at the RF frequency (e.g., about 13 GHz). Because the RF signal output by DDS-I 158 and DDS-Q 160 (FIG. 10) is offset from the RF frequency by the intermediate frequency (e.g., 16 MHz, 32 MHz, or 64 MHz), the signal received by receiver mixer 192 from receive antenna element 134 is offset from the RF frequency signal from second corporate feed 172 by the intermediate frequency. Hence, the signal output from receiver mixer 192 has a frequency of the intermediate frequency (e.g., 16 MHz, 32 MHz, or 64 MHz). The FMCW radar systems described herein thus may be heterodyne FMCW radar systems, and the intermediate frequency at which the receive signals are operated on (for at least part of the analog receive electronics 174) are created by heterodyning the signal received from receive antenna element 134 and the RF frequency signal from second corporate feed 172.

Receiver mixer 192 is operably coupled to a LNA 194, which amplifies the intermediate frequency signal received from receiver mixer 192 and outputs the amplified signal to quadrature mixer 210. Quadrature mixer 210 splits the receive signal into I and Q components at block 196 and sends the I and Q signals to mixers 198 and 200, respectively. At first mixer 198, the I signal down-converted to base band (e.g., between about 0 MHz and about 2 MHz) by combining the I signal with a reference clock signal 209, which is derived from the second corporate feed 172 signal and may have a frequency that is an integer multiple of the intermediate frequency. At second mixer 200, the Q signal down-converted to base band (e.g., between about 0 MHz and about 2 MHz) by combining the Q signal with reference clock signal 209. First mixer 198 is operatively coupled to a first phase shifter 202, which shifts the phase of the I signal to steer the receive beams in azimuth. Second mixer 200 is operatively coupled to a second phase shifter 204, which shifts the phase of the Q signal to steer the receive beams in azimuth.

As shown in FIG. 11, the phase-shifted I signal and the phase-shifter Q signal are output to respective summing operational amplifiers 206 and 208 (e.g., active filter summing operational amplifiers 206 and 208). Although not shown in FIG. 11 (see FIG. 12), first summing operational amplifier 206 may receive phase-shifted I signals corresponding to all receive antenna elements 134 in a row of one of quadrants 132 (FIG. 8). For each row in each of quadrants 132, a first summing operational amplifier 206 sums the I signals for the respective receive antenna elements 134 in the row of the quadrant. Similarly, second summing operational amplifier 208 may receive phase-shifted Q signals corresponding to all receive antenna elements 134 in a row of one of quadrants 132 (FIG. 8). For each row in each of quadrants, a second summing operational amplifier 208 sums the Q signals for the respective receive antenna elements 134 in the row of the quadrant. The summing operational amplifiers 206 and 208 output the summed I and Q signals for each row of each of quadrants 134 to analog to digital converter 176. In some examples, in addition to summing the I and Q signals, respectively, summing operational amplifiers 206 and 208 may apply a high pass filter, a low pass filter, or both, to shape the I and Q signals. The gain slopes for the optional high pass filter may be selected based on the application of the FMCW radar system. As examples, for weather detection, the high pass filter slope may be about 20 dB per octave; for ground imaging, the high pass filter slope may be about 30 dB per octave; for airborne target detection, the high pass filter slope may be about 40 dB per octave; or the like.

Figure 12:
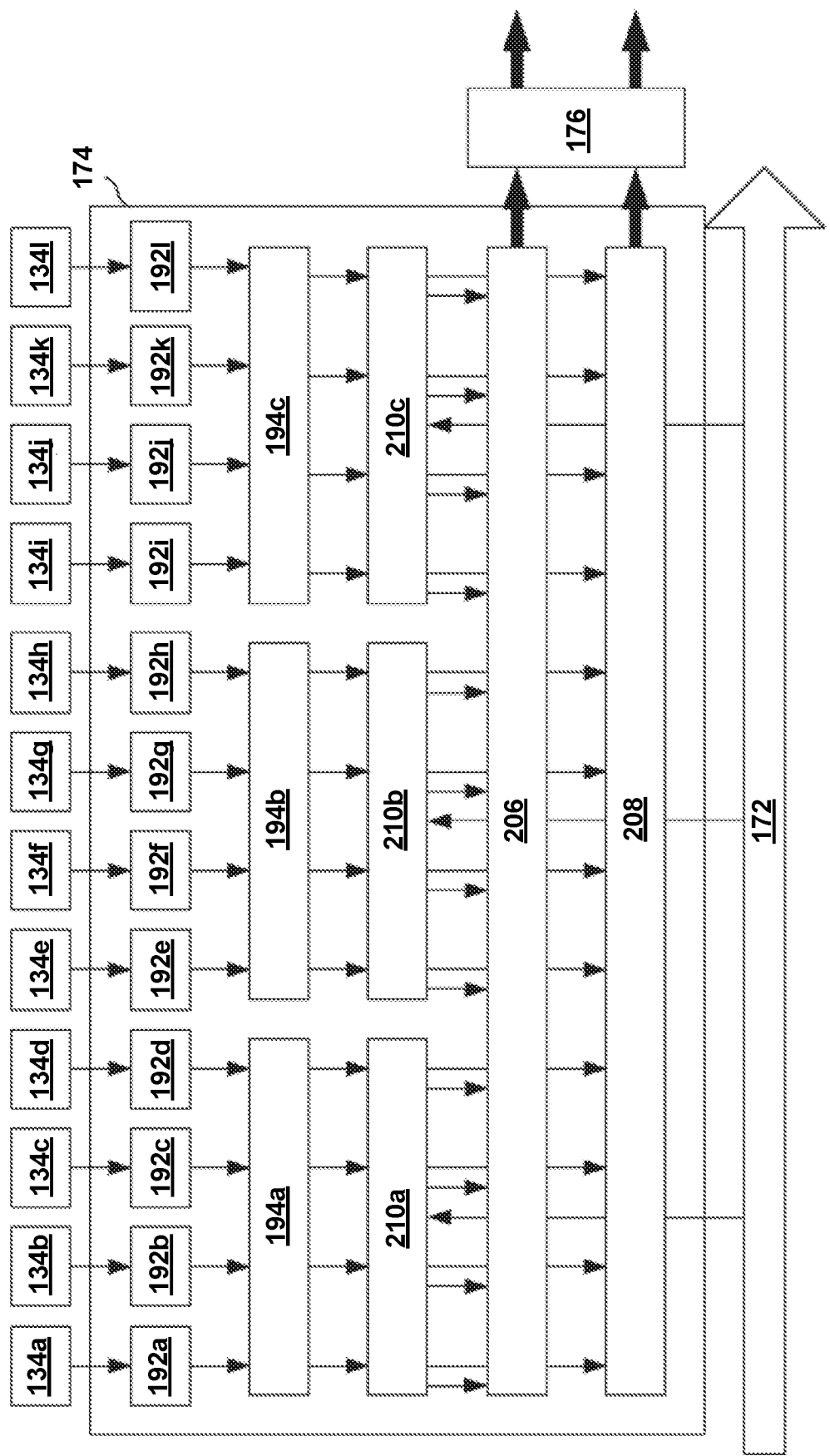
FIG. 12 is a conceptual block diagram illustrating an example quadrant of a receive array.

FIG. 12 illustrates another example conceptual block diagram of an analog receive electronics module portion for a row of a receive array 132. As shown in FIG. 12, a row of receive array 132 (FIG. 8) includes a plurality of receive antenna elements 134a-134l (collectively, "receive antenna elements 134"). Although twelve receive antenna elements 134 are illustrated in FIG. 12, in other examples, a row of a receive array 132 may include more or fewer receive antenna elements 134. In general, a row of receive array 132 may include a plurality of receive antenna elements.

Figure 13:
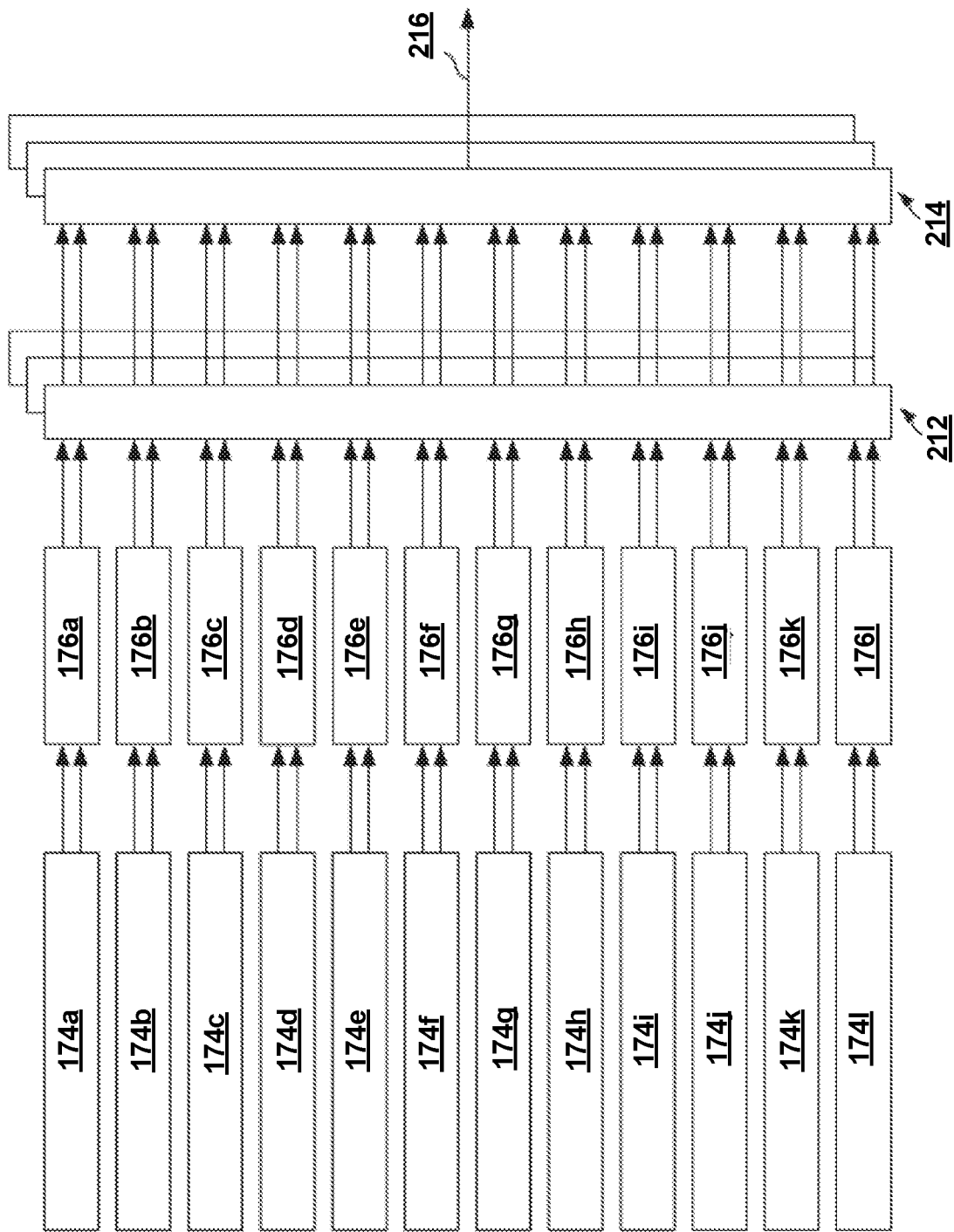
FIG. 13 is a functional block diagram illustrating example functions of analog to digital converters and portions of a digital receive electronics module for a quadrant of a receive array.

Each of receive antenna elements 134 is operably connected to a respective receiver mixer of the plurality of receiver mixers 192a-192l (collectively, "receiver mixers 192"). As described with respect to FIG. 11, each of receiver mixers 192 may also receive an RF signal from second corporate feed 172, although this is not shown in FIG. 12. Although twelve receiver mixers 192 are illustrated in FIG. 13, in other examples, analog receive electronics module 174 may include more or fewer receiver mixers 192. In some examples, analog receive electronics module 174 may include a respective receiver mixer 192 for each receive antenna element of receive antenna elements 134. Each of receiver mixers 192 is operably connected to a respective channel of one of LNAs 194a-194c (collectively, "LNAs 194").

LNAs 194 amplify the receive signal and are operably coupled to a respective channel of one of quadrature mixers 210a-210c (collectively, "quadrature mixers 210"). Although three LNAs 194 each with four channels are illustrated in FIG. 12, in other examples, each of LNAs 194 may include more or fewer channels, and there may be more or fewer LNAs 194 for a row of receive antenna elements 134. Similarly, although three quadrature mixers 210 each with four channels are illustrated in FIG. 12, in other examples, each of quadrature mixers 210 may include more or fewer channels, and there may be more or fewer quadrature mixers 210 for a row of receive antenna elements 134. Quadrature mixers 210 may down-convert the receive signal to base band, separate the receive signal into I and Q components, apply a phase shift to the I and Q components, and output the phase-shifted I and Q signals.

As shown in FIG. 12, quadrature mixers 210 may output the phase-shifted I signals to a first summing operational amplifier 206, which sums all of the phase-shifted I signals to yield a summed I signal for the row. Similarly, quadrature mixers 210 may output the phase-shifted Q signals to a second summing operational amplifier 208, which sums all of the phase-shifted Q signals to yield a summed Q signal for the row. First summing operational amplifier 206 outputs the summed I signal to analog-to-digital converter 176, and second summing operational amplifier 208 outputs the summed Q signal to analog-to-digital converter 176. Receive array 120 may include components that perform substantially similar functions for each row of receive antenna elements 134 in each quadrant 134 of the receive array 120.

Figure 14:
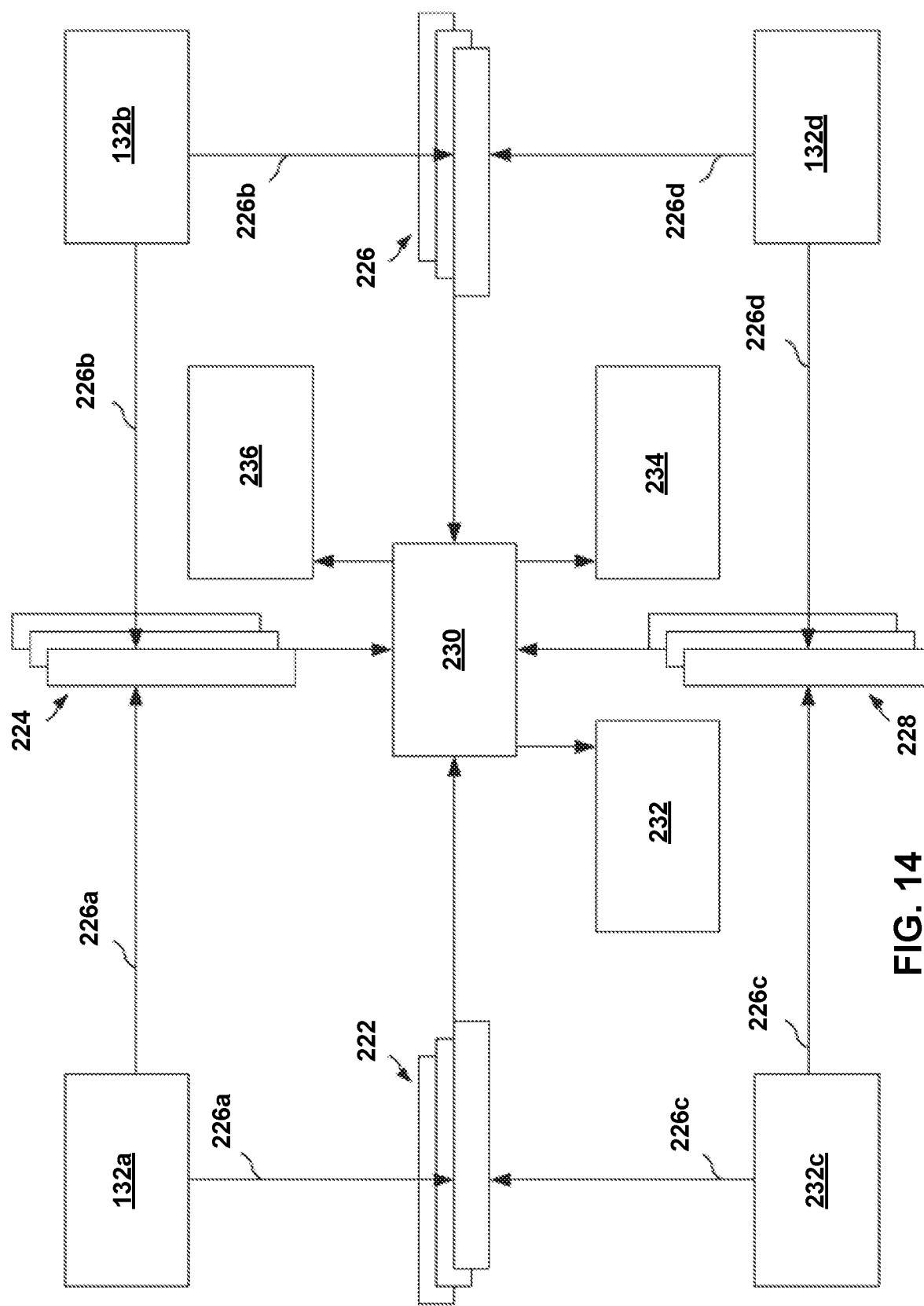
FIG. 14 is a functional block diagram illustrating example functions for producing a plurality of receive beams.

Referring to FIG. 10, analog-to-digital converter 176 outputs the digital data streams for the summed I and Q values to a digital receive electronics module 178. Digital receive electronics module 178 may be configured to generate a plurality of receive beams from the digital data streams for the summed I and Q values received from analog-to-digital converter 176. FIGS. 13 and 14 illustrate example aspects of an example digital receive electronics module 178. FIG. 13 is a functional block diagram illustrating example functions of analog to digital converters 176a-176l (collectively analog to digital converters 176) and portions of a digital receive electronics module 178 for a quadrant 132 of a receive array 120. FIG. 14 is a functional block diagram illustrating example functions for producing a plurality of receive beams from signals received from a respective receive electronics module 174 for each quadrant 132 of a receive array 120.

As shown in FIG. 13, a plurality of analog receive electronics module 174a-174l each outputs a respective summed I signal and a respective summed Q signal to a respective one of analog-to-digital converters 176. In the example of FIG. 13, twelve analog receive electronics module 174 and twelve analog-to-digital converters 176 are depicted. However, in other examples, a quadrant 132 may include more or fewer rows of receive antenna elements 134, and may accordingly include more or fewer analog receive electronics module 174. In some examples, a receive array 120 includes an analog receive electronics module 174 for each row of each of quadrants 132. Similarly, a receive array 120 may include more or fewer analog-to-digital converters 176, and the number of analog-to-digital converters for a quadrant 132 may be the same as or different than the number of rows of receive antenna elements 134 in the quadrant 132.

Each of the analog-to-digital converters 176 converts an analog summed I signal to a digital I data stream and an analog summed Q signal to a digital Q data stream. Digital receive electronics module 178 then may apply a complex beam weight 212 to the digital I data streams and digital Q data streams and sum 214 the results to generate a weighted I data stream and a weighted Q data stream 216 for the quadrant. The complex beam weight may be selected to result in weighted I and Q data streams 216 being generated that will be used by digital receive electronics module 178 to generate a receive beam at a predetermined elevation position, as described with reference to FIG. 9. The number of complex beam weights 212 may be the same as the number of receive beam positions.

In some examples, digital receive electronics module 178 may reuse the digital I data streams and the digital Q data streams by applying a different complex beam weight 212 to the digital I signals and the digital Q data streams to generate each of a plurality of weighted I and Q data streams 216. Each of the plurality of complex beam weights 212 may be selected to result in a respective weighted I and Q data stream being generated that is used to form a receive beam at a predetermined elevation position. The complex beam weights 212 may apply both amplitude taper and elevation beam steering to the digital I data streams and the digital Q data streams. The result of the applying the complex beam weights 212 is a plurality of weighted I data streams and a plurality of weighted Q data streams 216, one weighted I data stream and one weighted Q data stream 216 for each of the complex beam weights 212. Hence, each of quadrants 132 forms a plurality of weighted I data streams and a plurality of weighted Q data streams 216, one data stream in I and Q for each of the receive beam positions. To facilitate formation of the monopulse tracking beams, the number of weighted I data streams and weighted Q data streams 216 output by each of quadrants 132 may be the same.

As shown in FIG. 14, the output weighted I data streams and weighted Q data streams 216 are used by the digital receive electronics module 178 to form monopulse tracking beams at each receive beam position. As shown in FIG. 14, each of quadrants 132 outputs a respective plurality of weighted I data streams and plurality of weighted Q data streams 216a-216d (collectively, "plurality of weighted I data streams and plurality of weighted Q data streams 216"). The number of weighted I data streams and the number of weighted Q data streams 216 for each of quadrants 132 corresponds to the number of receive beam positions.

Digital receive electronics module 178 sums the first weighted I data stream from the first quadrant 132a and the first weighted I data stream from second quadrant 132b (the top two quadrants) to form a first top I data stream. Each of the first weighted I data streams may correspond to the same (a first) receive beam position. Similarly, digital receive electronics module 178 sums the first weighted Q data stream from the first quadrant 132a and the first weighted Q data stream from second quadrant 132b to form a first top Q data stream. Each of the first weighted Q data streams may correspond to the same (the first) receive beam position. Digital receive electronics module 178 repeats this summation for each of the plurality of weighted I data streams and each of plurality of weighted Q data streams 216*a* from first quadrant 132*a* and each of the plurality of weighted I data streams and each of plurality of weighted Q data streams 216*b* from second quadrant 132*b*. This results in a plurality of top I data streams and a plurality of top Q data streams 224, with the number of top I data streams and the number of top Q data streams 224 corresponding to the number of receive beam positions.

Similarly, digital receive electronics module 178 sums the first weighted I data stream from the first quadrant 132*a* and the first weighted I data stream from third quadrant 132*c* (the left two quadrants) to form a first left I data stream. Each of the first weighted I data streams may correspond to the same (a first) receive beam position. Similarly, digital receive electronics module 178 sums the first weighted Q data stream from the first quadrant 132*a* and the first weighted Q data stream from third quadrant 132*c* to form a first left Q data stream. Each of the first weighted Q data streams may correspond to the same (the first) receive beam position. Digital receive electronics module 178 repeats this summation for each of the plurality of weighted I data streams and each of plurality of weighted Q data streams 216*a* from first quadrant 132*a* and each of the plurality of weighted I data streams and each of plurality of weighted Q data streams 216*c* from third quadrant 132*c*. This results in a plurality of left I data streams and a plurality of left Q data streams 222, with the number of left I data streams and the number of left Q data streams 222 corresponding to the number of receive beam positions.

Digital receive electronics module 178 performs this process for each for each of the plurality of weighted I data streams and each of plurality of weighted Q data streams 216*c* from third quadrant 132*c* and each of the plurality of weighted I data streams and each of plurality of weighted Q data streams 216*d* from fourth quadrant 132*d* to form a plurality of bottom I data streams and a plurality of bottom Q data streams 228. Digital receive electronics module 178 also performs this process for each for each of the plurality of weighted I data streams and each of plurality of weighted Q data streams 216*b* from second quadrant 132*b* and each of the plurality of weighted I data streams and each of plurality of weighted Q data streams 216*d* from fourth quadrant 132*d* to form a plurality of right I data streams and a plurality of right Q data streams 226.

Digital receive electronics module 178 performs monopulse arithmetic 230 using the plurality of I and Q data streams 222, 224, 226, and 228 to form a monopulse sum beam, a monopulse azimuth delta beam, and a monopulse elevation delta beam for each of the receive beam positions. For example, by summing each of the first I data streams and each of the first Q data streams, digital receive electronics module 178 may form a monopulse sum beam for the first receive beam position. By subtracting the first right I and Q data streams from the first left I and Q data streams, digital receive electronics module 178 may form a monopulse azimuth delta beam for the first receive beam position. By subtracting the first bottom I and Q data streams from the first top I and Q data streams, digital receive electronics module 178 may form a monopulse elevation delta beam for the first receive beam position. Digital receive electronics module 178 may perform similar calculations to form a monopulse sum beam, a monopulse azimuth delta beam, and a monopulse elevation delta beam at each receive beam position using respective ones of the plurality of left, top, right, and bottom I and Q data streams 222, 224, 226, and 228.

After digital receive electronics module 178 has formed each of the plurality of monopulse sum beams, each of the plurality of monopulse azimuth delta beams, and each of the plurality of monopulse elevation delta beams (one of each beam for each receive beam position), digital receive electronics module 178 applies a Fast Fourier Transform (FFT) to each respective beam to transform the beam from the frequency domain to the range domain. In some examples, the FFT generates 2048 FFT bins, each bin corresponding to a range bin of about 24 feet (about 8 meters). The monopulse beams may allow monopulse beam tracking of objects in the predetermined window 148 (FIG. 9).

In some examples, the receive electronics module, which may include analog receive electronics module 174, analog-to-digital converter 176, and digital receive electronics module 178, may steer the receive beams in azimuth by applying a phase shift to the receive signals from each of receive antenna elements 134 using analog receive electronics module 174. Analog receive electronics module 174 may sequentially apply different phase shifts to the receive signals from each of receive antenna elements 134 to steer the receive beams in azimuth. At each azimuth position, digital receive electronics module 178 may generate the plurality of receive beams (including monopulse sum, azimuth delta, and elevation delta beams at each receive beam position). In some examples, the elevation position of each of the receive beams may not change as the receive beams are scanned in azimuth. In other words, in some examples, digital receive electronics module 178 applies the same set of complex beam weights to the I digital steams and Q digital streams at least of the azimuth positions. The output of the digital receive electronics module 178 may be used by the radar system for target selection and tracking.

By performing most manipulations of the receive signals at baseband frequencies rather than RF and summing the I and Q signals for each row in a quadrant before digitally forming the plurality of receive beams, component count may be reduced and power efficiency may be increased. Additionally or alternatively, less complex and/or inefficient phase shifters may be used compared to when phase shifting is performed at RF. In some examples, this may reduce or substantially eliminate receiver losses and may not utilize receiver amplifiers with their attendant power dissipation, circuit board space, and cost. In some examples, receive array 120 does include a respective low noise amplifier (LNA) between a respective receive antenna element 134 and a respective receiver mixer 192. If present between the respective receive antenna element 134 and the respective receiver mixer 192, the LNA may reduce transmit array-to-receive array isolation and the LNA may be saturated by nearby transmit array leakage power. By avoiding LNAs at every receive antenna element, the parts count of receive array 120 may be reduced, which may improve cost, power dissipation, and/or reliability of receive array 120. Additionally, the formation of multiple receive beams and monopulse tracking beams at each receive beam position may facilitate object tracking by the radar system.

Figure 15:
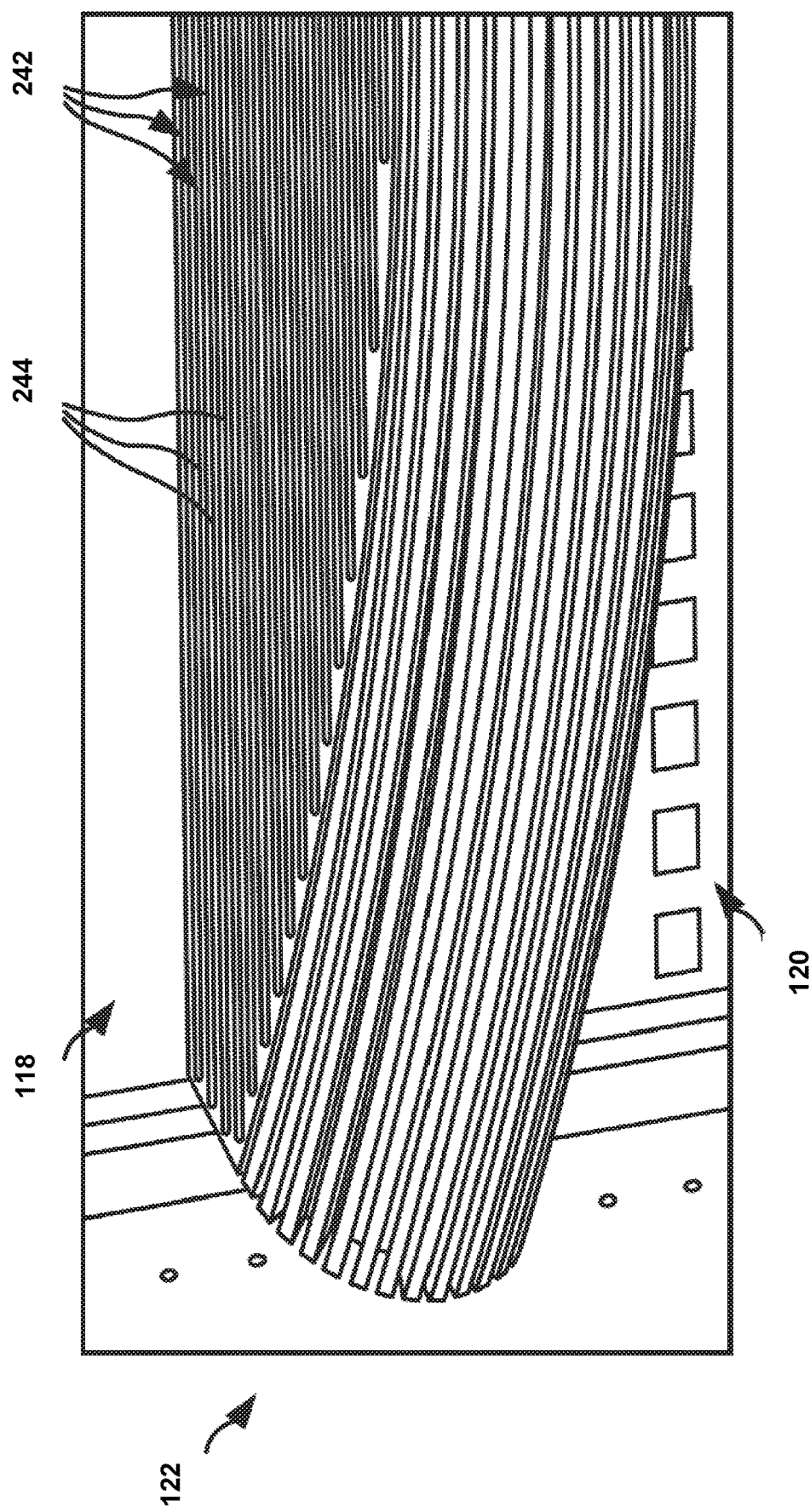
FIG. 15 is a conceptual and schematic diagram illustrating an example slotted choke disposed between a transmit array and a receive array of an FMCW radar array.

FMCW radar arrays 112 also may include physical or mechanical structures that facilitate operation of FMCW radar arrays 112, including positioning a transmit array 118 and a receive array 120 in relatively close proximity and transmitting a substantially continuous in time FMCW transmit beam. As described above, FMCW radar arrays 112 (FIGS. 6A-8) may include a slotted choke 122. FIG. 15 is a conceptual and schematic diagram illustrating an example slotted choke 122 disposed between a transmit array 118 and a receive array 120 of an FMCW radar array (e.g., FMCW radar array 112 illustrated in FIGS. 6A and 6B).

Slotted choke 122 may include a body 244 formed of an electrically-conductive material or an electrically insulative material coated with an electrically conductive material. Slotted choke 122 may define a plurality of slots 242, which are sized, shaped, and/or placed to attenuate strength, proximate to receive array 120, of electromagnetic radiation output by the transmit antenna of transmit array 118. In some examples, at least some of slots 242 may define a depth that is equal to about ¼ of the wavelength of the transmit beam and a width that is equal to about ⅛ of the wavelength of the transmit beam. In some examples, the spacing between adjacent slots 242 may be equal to about ⅛ of the wavelength of the transmit beam.

The following examples may illustrate one or more of the techniques of this disclosure.

Example 1

A radar system is configured to mount on an ownship vehicle for interleaving a weather detection mode and an object detection mode. The radar system includes a phased-array radar device configured to receive weather signals in the weather detection mode, receive sensing signals in the object detection mode, and interleave the weather detection mode and the object detection mode. The radar system further includes processing circuitry configured to determine weather conditions based on the received weather signals and detect an object based on the received sensing signals.

Example 2

The radar system of example 1, wherein the phased-array radar device is further configured to detect wind shear in the weather detection mode and receive reflectivity returns in the weather detection mode.

Example 3

The radar system of examples 1-2 or any combination thereof, wherein the phased-array radar device is configured to transmit and receive the sensing signals at altitudes of less than two thousand feet above a ground surface.

Example 4

The radar system of examples 1-3 or any combination thereof, wherein the phased-array radar device is configured to interleave the weather detection mode and the object detection mode at an interleaving rate, wherein the interleaving rate is greater than once per two seconds.

Example 5

The radar system of examples 1-4 or any combination thereof, further including a memory device configured to store expected characteristics of objects, wherein the processing circuitry is configured to detect objects based on the received sensing signals by at least comparing actual characteristics of the received sensing signals to the expected characteristics of objects.

Example 6

The radar system of examples 1-5 or any combination thereof, wherein the phased-array radar device is further configured to transmit sensing signals in the object detection mode by at least transmitting at least one upper elevation beam at a first angle higher than a slope of the ownship vehicle, transmitting at least one lower elevation beam at a second angle lower than the slope of the ownship vehicle, and transmitting an azimuth beam.

Example 7

The radar system of examples 1-6 or any combination thereof, wherein the processing circuitry is configured to determine a range of the at least one lower elevation beam based on an altitude of the ownship vehicle or a distance from the ownship vehicle to a runway.

Example 8

The radar system of examples 1-7 or any combination thereof, wherein the phased-array radar device is further configured to transmit surveillance signals indicating a location and a direction of travel of the ownship vehicle.

Example 9

A method for interleaving a weather detection mode and an object detection mode includes receiving, by a phased-array radar device, weather signals in the weather detection mode. The method further includes receiving, by the phased-array radar device, sensing signals in the object detection mode. The method also includes interleaving the weather detection mode and the object detection mode. The method includes determining, by processing circuitry, weather conditions based on the received weather signals. The method also includes detecting, by the processing circuitry, an object based on the received sensing signals.

Example 10

The method of example 9, further including detecting, by the phased-array radar device, wind shear in the weather detection mode, and receiving, by the phased-array radar device, reflectivity returns in the weather detection mode.

Example 11

The method of examples 9-10 or any combination thereof, further including transmitting, by the phased-array radar device, the sensing signals in the object detection mode at altitudes of less than two thousand feet above a ground surface, wherein receiving the sensing signals in the object detection mode includes receiving the sensing signals at altitudes of less than two thousand feet above a ground surface.

Example 12

The method of examples 9-11 or any combination thereof, wherein interleaving the weather detection mode and the object detection mode includes interleaving the weather detection mode and the object detection mode at an interleaving rate, wherein the interleaving rate is greater than once per two seconds.

Example 13

The method of examples 9-12 or any combination thereof, further includes storing expected characteristics of objects, wherein detecting objects based on the received sensing signals by at least comparing actual characteristics of the received sensing signals to the expected characteristics of objects.

Example 14

The method of examples 9-13 or any combination thereof, further including transmitting sensing signals in the object detection mode, wherein transmitting the sensing signals includes transmitting at least one elevation beam at a first angle higher than a slope of an ownship vehicle including a radar system including the phased-array radar device and the processing circuitry, transmitting at least one elevation beam at a second angle lower than the slope of the ownship vehicle, and transmitting an azimuth beam.

Example 15

The method of examples 9-14 or any combination thereof, further including transmitting surveillance signals indicating a location and a direction of travel of an ownship vehicle including a radar system including the phased-array radar device and the processing circuitry.

Example 16

A device includes a computer-readable medium having executable instructions stored thereon, configured to be executable by one or more processors for causing the one or more processors to receive, from a phased-array radar device, weather signals in the weather detection mode. The executable instructions further cause the one or more processors to receive, from the phased-array radar device, sensing signals in the object detection mode. The executable instructions further cause the one or more processors to interleave the weather detection mode and the object detection mode. The executable instructions further cause the one or more processors to determine weather conditions based on the received weather signals. The executable instructions further cause the one or more processors to detect an object based on the received sensing signals.

Example 17

The device of example 16, wherein the executable instructions further cause the one or more processors to detect wind shear in the weather detection mode and determine reflectivity in the weather detection mode.

Example 18

The device of examples 16-17 or any combination thereof, wherein the executable instructions further cause the one or more processors to interleave the weather detection mode and the object detection mode at an interleaving rate, wherein the interleaving rate is greater than once per two seconds.

Example 19

The device of examples 16-18 or any combination thereof, wherein the executable instructions further cause the one or more processors to store expected characteristics of objects and compare actual characteristics of the received sensing signals to the expected characteristics of objects.

Example 20

The device of examples 16-19 or any combination thereof, wherein the executable instructions further cause the one or more processors to cause the phased-array radar device to transmit at least one elevation beam at a first angle higher than a slope of an ownship vehicle including the device, cause the phased-array radar device to transmit at least one elevation beam at a second angle lower than the slope of the ownship vehicle, and cause the phased-array radar device to transmit an azimuth beam.

The techniques of this disclosure may be implemented in a device or article of manufacture including a computer-readable storage medium. The term "processing circuitry," as used herein may refer to any of the foregoing structure or any other structure suitable for processing program code and/or data or otherwise implementing the techniques described herein. Elements of processing circuitry may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

Radar system 4 may include one or more memory devices, such as memory device 28, that include any volatile or non-volatile media, such as a RAM, ROM, non-volatile RAM (NVRAM), electrically erasable programmable ROM (EEPROM), flash memory, and the like. The one or more memory devices may store computer readable instructions that, when executed by processing circuitry, cause the processing circuitry to implement the techniques attributed herein to processing circuitry.

Elements of the processing circuitry and/or the transceiver may be programmed with various forms of software. The processing circuitry and/or the transceiver may be implemented at least in part as, or include, one or more executable applications, application modules, libraries, classes, methods, objects, routines, subroutines, firmware, and/or embedded code, for example. Elements of the processing circuitry and/or the transceiver as in any of the examples herein may be implemented as a device, a system, an apparatus, and may embody or implement a method of interleaving a weather detection mode and object detection mode.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft).

Various illustrative aspects of the disclosure are described above. These and other aspects are within the scope of the following claims.

What is claimed is:

1. A radar system, configured to mount on an ownship vehicle, and for interleaving a weather detection mode and a noncooperative unmanned aerial vehicle (UAV) detection mode, the radar system comprising:
   an airborne-capable phased-array radar device configured to:
      receive weather signals in the weather detection mode,
      receive sensing signals in the noncooperative UAV detection mode by at least:
         receiving at least one upper elevation beam at a first angle higher than a slope of the ownship vehicle; and
         receiving at least one lower elevation beam at a second angle lower than the slope of the ownship vehicle,
      interleave the weather detection mode and the noncooperative UAV detection mode at an interleaving rate, the interleaving rate being greater than once per two seconds, and
      complete a full cycle through the weather detection mode and the noncooperative UAV detection mode in less than two seconds; and
   processing circuitry configured to:
      determine weather conditions based on the received weather signals, and
      detect a noncooperative UAV based on the received sensing signals, wherein the noncooperative UAV is nonresponsive, and wherein the noncooperative UAV is outside of the system.

2. The radar system of claim 1,
   wherein the weather detection mode is configured to, while operating in the weather detection mode, operate in a windshear mode that is a sub mode of the weather detection mode, and
   wherein the airborne-capable phased-array radar device is further configured to interleave the noncooperative UAV detection mode with the windshear mode.

3. The radar system of claim 1, wherein the airborne-capable phased-array radar device is configured to transmit and receive the sensing signals at altitudes of less than two thousand feet above a ground surface for aircraft on final approach.

4. The radar system of claim 1, further comprising a memory device configured to store expected characteristics of UAVs, wherein the processing circuitry is configured to detect noncooperative UAVs based on the received sensing signals by at least comparing actual characteristics of the received sensing signals to the expected characteristics of UAVs.

5. The radar system of claim 1, wherein the processing circuitry is configured to determine a UAV detection range of the at least one lower elevation beam based on an altitude of the ownship vehicle or a distance from the ownship vehicle to a runway.

6. The radar system of claim 1,
   wherein the airborne-capable phased-array radar device is configured to transmit a first beam, and
   wherein the processing circuitry is configured to steer a plurality of receive beams within an area illuminated by the first beam by applying a phase shift to the received sensing signals.

7. The radar system of claim 1, wherein the processing circuitry is further configured to determine a size, speed, and direction of travel of the noncooperative UAV based on the received sensing signals.

8. The radar system of claim 1,
   wherein the first angle is higher than the slope of a direction of travel of the ownship vehicle, and
   wherein the second angle is lower than the slope of a direction of travel of the ownship vehicle.

9. A method for interleaving a weather detection mode and a noncooperative unmanned aerial vehicle (UAV) detection mode, the method comprising:
   receiving, by an airborne-capable phased-array radar device, weather signals in the weather detection mode;
   receiving, by the airborne-capable phased-array radar device, sensing signals in the noncooperative UAV detection mode by at least:
      receiving at least one upper elevation beam at a first angle higher than a slope of the ownship vehicle; and
      receiving at least one lower elevation beam at a second angle lower than the slope of the ownship vehicle;
   interleaving the weather detection mode and the noncooperative UAV detection mode at an interleaving rate, the interleaving rate being greater than once per two seconds;
   completing a full cycle through the weather detection mode and the noncooperative UAV detection mode in less than two seconds;
   determining, by processing circuitry, weather conditions based on the received weather signals; and
   detecting, by the processing circuitry, a noncooperative UAV based on the received sensing signals, wherein the noncooperative UAV is nonresponsive, and wherein the noncooperative UAV is outside of the system.

10. The method of claim 9,
    wherein the weather detection mode comprises a windshear mode that is a sub mode of the weather detection mode, and
    wherein interleaving the weather detection mode and the noncooperative UAV detection mode comprises interleaving the noncooperative UAV detection with the windshear mode.

11. The method of claim 9, further comprising transmitting, by the airborne-capable phased-array radar device, the sensing signals in the noncooperative UAV detection mode at altitudes of less than two thousand feet above a ground surface,
    wherein receiving the sensing signals in the noncooperative UAV detection mode comprises receiving the sensing signals at altitudes of less than two thousand feet above a ground surface for aircraft on final approach.

12. The method of claim 9, further comprising storing expected characteristics of UAVs, wherein detecting noncooperative UAVs based on the received sensing signals by at least comparing actual characteristics of the received sensing signals to the expected characteristics of UAVs.

13. The method of claim 9, further comprising:
transmitting a first beam; and
steering a plurality of receive beams within an area illuminated by the first beam by applying a phase shift to the received sensing signals.

14. The method of claim 9, further comprising determining a size, speed, and direction of travel of the noncooperative UAV based on the received sensing signals.

15. The method of claim 9, further comprising determining a UAV detection range of the at least one lower elevation beam based on an altitude of the ownship vehicle or a distance from the ownship vehicle to a runway.

16. A device comprising a computer-readable medium having executable instructions stored thereon, configured to be executable by one or more processors for causing the one or more processors to:
cause the airborne-capable phased-array radar device to transmit an azimuth beam;
receive, from an airborne-capable phased-array radar device, weather signals in the weather detection mode;
receive, from the airborne-capable phased-array radar device, sensing signals in a noncooperative unmanned aerial vehicle (UAV) detection mode by at least:
receiving at least one upper elevation beam at a first angle higher than a slope of the ownship vehicle; and
receiving at least one lower elevation beam at a second angle lower than the slope of the ownship vehicle;
interleave a weather detection mode and the noncooperative UAV detection mode at an interleaving rate, the interleaving rate being greater than once per two seconds;
complete a full cycle through the weather detection mode and the noncooperative UAV detection mode in less than two seconds;
determine weather conditions based on the received weather signals; and
detect a noncooperative UAV based on the received sensing signals, wherein the noncooperative UAV is nonresponsive, and wherein the noncooperative UAV is outside of the system.

17. The device of claim 16,
wherein the weather detection mode comprises a windshear mode that is a sub mode of the weather detection mode, and
wherein the executable instructions further cause the one or more processors to interleave the noncooperative UAV detection mode with the windshear mode.

18. The device of claim 16, wherein the executable instructions further cause the one or more processors to:
store expected characteristics of UAVs; and
compare actual characteristics of the received sensing signals to the expected characteristics of UAVs.

19. The device of claim 16, wherein the executable instructions further cause the one or more processors to steer a plurality of receive beams within an area illuminated by the azimuth first beam by applying a phase shift to the received sensing signals.

20. The device of claim 16, wherein the executable instructions further cause the one or more processors to cause the airborne-capable phased-array radar device to transmit and receive the sensing signals at altitudes of less than two thousand feet above a ground surface for aircraft on final approach.

* * * * *